US012722316B2

(12) United States Patent
Park

(10) Patent No.: US 12,722,316 B2
(45) Date of Patent: Sep. 1, 2026

(54) RAZOR CARTRIDGE

(71) Applicant: DORCO CO., LTD., Seoul (KR)

(72) Inventor: Min Joo Park, Seoul (KR)

(73) Assignee: DORCO CO., LTD., Seoul (KR)

( * ) Notice: Subject to any disclaimer, the term of this patent is extended or adjusted under 35 U.S.C. 154(b) by 113 days.

(21) Appl. No.: 18/763,385

(22) Filed: Jul. 3, 2024

(65) Prior Publication Data

US 2025/0010503 A1 Jan. 9, 2025

(30) Foreign Application Priority Data

Jul. 6, 2023 (KR) ........................ 10-2023-0087843

(51) Int. Cl.
*B26B 21/40* (2006.01)
*B26B 21/22* (2006.01)

(52) U.S. Cl.
CPC ...... *B26B 21/4031* (2013.01); *B26B 21/4018* (2013.01); *B26B 21/4025* (2013.01); *B26B 21/225* (2013.01)

(58) Field of Classification Search
CPC ............ B26B 21/4031; B26B 21/4018; B26B 21/4025; B26B 21/225; B26B 21/4006; B26B 21/443; B26B 21/22; B21B 21/222; B21B 21/227; B21B 21/4012; B21B 21/56
USPC .............................................................. 30/50
See application file for complete search history.

(56) References Cited

U.S. PATENT DOCUMENTS 11,000,960 B1 * 5/2021 Hooberman ........ B26B 21/4031
2002/0088122 A1 7/2002 Zuidervaart
2010/0011588 A1 * 1/2010 Wang .................. B26B 21/4025 30/41
2011/0162209 A1 7/2011 Wain
2012/0110857 A1 * 5/2012 Peterson ............. B26B 21/4031 30/50

(Continued)

FOREIGN PATENT DOCUMENTS

GB 1456202 A 11/1976
KR 20170023059 A * 3/2017 ............ B26B 21/14

(Continued)

OTHER PUBLICATIONS

Extended European Search Report dated Nov. 14, 2024 in EP Patent Application No. 24186274.7, in 11 pages.

*Primary Examiner* — Ghassem Alie
(74) *Attorney, Agent, or Firm* — Knobbe, Martens, Olson & Bear, LLP

(57) ABSTRACT

A razor cartridge is proposed. The cartridge may include a first blade including a first base portion and a first edge portion forming a predetermined angle with the first base portion and having a first cutting edge. The cartridge may also include a second blade located adjacent to the rear of the first blade, the second blade including a second base portion and a second edge portion forming a predetermined angle with the second base portion and having a second cutting edge. The cartridge may further include a blade housing accommodating the first blade and the second blade. A first gap, between the first cutting edge and the second cutting edge, is greater than a second gap between the first base portion and the second base portion, measured along a direction parallel to a virtual straight line passing through the first cutting edge and the second cutting edge.

15 Claims, 14 Drawing Sheets

(56) References Cited

U.S. PATENT DOCUMENTS

| | | | | |
|---|---|---|---|---|
| 2014/0026424 | A1* | 1/2014 | Oglesby | B26B 21/4031 30/50 |
| 2014/0283387 | A1 | 9/2014 | Bozikis et al. | |
| 2016/0167242 | A1 | 6/2016 | Noh et al. | |
| 2018/0071931 | A1 | 3/2018 | Walker, Jr. et al. | |

FOREIGN PATENT DOCUMENTS

| | | | | | |
|---|---|---|---|---|---|
| KR | 20230081040 | A | * | 6/2023 | B26B 21/222 |
| WO | WO-2004112986 | A1 | * | 12/2004 | B26B 21/22 |

* cited by examiner

RAZOR CARTRIDGE

CROSS REFERENCE TO RELATED APPLICATION

This application claims the benefit of Korean Patent Application No. 10-2023-0087843 filed on Jul. 6, 2023, the contents of which are all hereby incorporated by reference herein in their entirety.

BACKGROUND

Technical Field

The present disclosure relates to a razor cartridge, and more particularly to, a razor cartridge in which a blade is accommodated.

Description of Related Technology

A razor is a product for cutting body hair such as fine hair on the face or body, and beard. The razor includes a handle for gripping and a razor cartridge for contacting the skin to shave.

SUMMARY

One aspect is a razor cartridge that provides excellent shaving performance while relieving skin irritation by including blades with various shaving angles (SA).

The aspects of the present disclosure are not limited to those mentioned above, and other aspects not mentioned herein will be clearly understood by those skilled in the art from the following description.

Another aspect is a razor cartridge that includes: a first blade including a first base portion and a first edge portion forming a predetermined angle with the first base portion and having a first cutting edge; a second blade located adjacent to the rear of the first blade, the second blade including a second base portion and a second edge portion forming a predetermined angle with the second base portion and having a second cutting edge; and a blade housing including a guard and a cap defining a shaving plane, the blade housing accommodating the first blade and the second blade such that the first cutting edge and the second cutting edge are exposed toward the front between the guard and the cap, wherein a first gap, which is a gap between the first cutting edge and the second cutting edge, is greater than a second gap between the first base portion and the second base portion, measured along a direction parallel to a virtual straight line passing through the first cutting edge and the second cutting edge.

Other specific details of the present disclosure are included in the detailed description and drawings.

According to the embodiments of the present disclosure, there are at least the following benefits.

Excellent shaving performance can be maintained while reducing skin irritation.

The benefits according to the embodiments of the present disclosure are not limited to the contents exemplified above, and further various benefits are included in the present specification.

DETAILED DESCRIPTION

Figure 1:
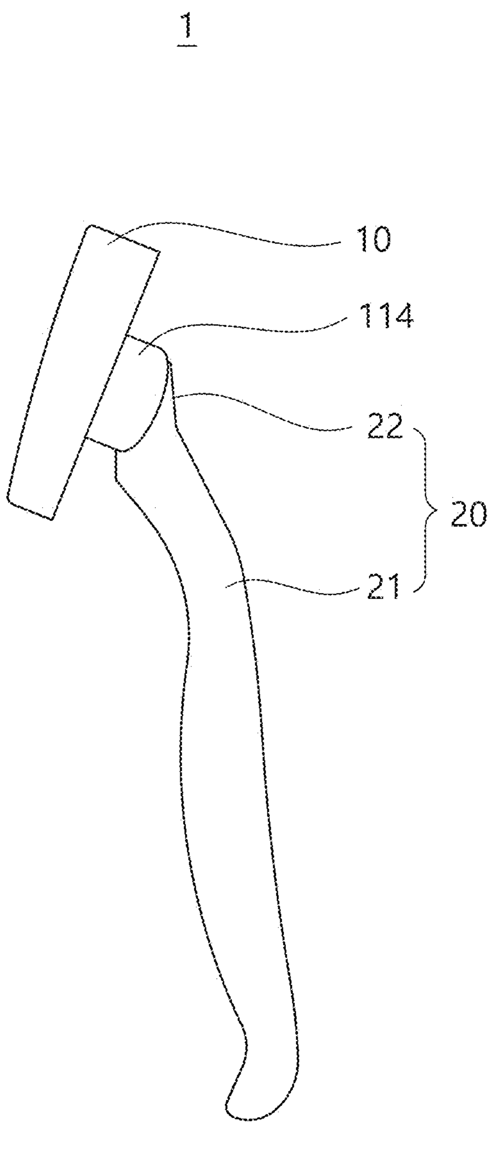
FIG. 1 is a perspective view of a razor according to an embodiment of the present disclosure.

Razors are divided into system razors with replaceable razor cartridges and portable razors with non-replaceable razor cartridges.

A razor cartridge includes at least one blade longitudinally accommodated within a blade housing, and the cutting edge of the blade is exposed through the top of the blade housing.

The shaving plane may be defined as a virtual plane in contact with a guard located in front of an upper surface of the razor cartridge and a cap located in rear of the upper surface of the razor cartridge.

A shave angle (SA), which is the angle at which the cutting edge of the blade faces the shaving plane, is closely related to shaving feel and shaving performance.

When the SA is small, there is a high probability that the cutting edge does not come into direct contact with the skin, providing a smooth shave with less irritation felt by the skin during a shaving process. However, since the cutting edge does not adhere closely to the skin, there is a high possibility that a clean shave will not be achieved.

On the other hand, when the SA is large, the cutting edge is in direct contact with the skin, so a clean shave is achieved, but the irritation felt by the skin becomes stronger.

The advantages and features of the present disclosure and methods of achieving them will be apparent from the embodiments that will be described in detail with reference to the accompanying drawings. It should be noted, however, that the present disclosure is not limited to the following embodiments, and may be implemented in various different forms. Rather the embodiments are provided so that this disclosure will be thorough and complete and will fully convey the scope of the present disclosure to those skilled in the technical field to which the present disclosure pertains, and the present disclosure will only be defined by the appended claims.

In addition, the embodiments described herein will be described with reference to cross-sectional diagrams and/or schematic diagrams, which are ideal exemplary views of the present disclosure. Accordingly, variations from the shapes of the exemplary diagrams as a result, for example, of manufacturing techniques and/or tolerances are to be expected. In addition, in each drawing illustrated in the present disclosure, each component may be illustrated somewhat enlarged or reduced in consideration of convenience of explanation. Like reference numerals designate like components throughout the specification.

Further, first, second, i), ii), a), b) and the like terms may be used in describing elements according to embodiments of the disclosure. Such terms are used solely for the purpose of differentiating one element from another, but not limit the substances, the order, sequence, etc. of those elements. Throughout this specification, when a part 'includes' or 'comprises' an element, the part is meant to further include other elements rather than excluding other elements unless otherwise stated explicitly.

Hereinafter, a razor according to embodiments of the present disclosure will be described with reference to the accompanying drawings.

FIG. 1 is a perspective view of a razor 1 according to an embodiment of the present disclosure.

Referring to FIG. 1, the razor 1 according to an embodiment includes a razor cartridge 10, and a handle 20 to which the razor cartridge 10 is pivotably coupled.

The handle 20 includes a handle body 21 and a handle head 22.

The handle body 21 refers to a portion to be gripped by a user. The handle head 22 is provided at one end of the handle body 21, allows the razor cartridge 10 to be removably coupled thereto, and pivotably supports the coupled razor cartridge 10.

In addition, the handle head 22 may removably couple with a handle coupling unit 114. In this connection, the handle 20 may be provided with an operation unit (not shown) for operating the handle head 22. A user may operate the operation unit to release the coupling between the handle head 22 and the handle coupling unit 114.

Figure 2:
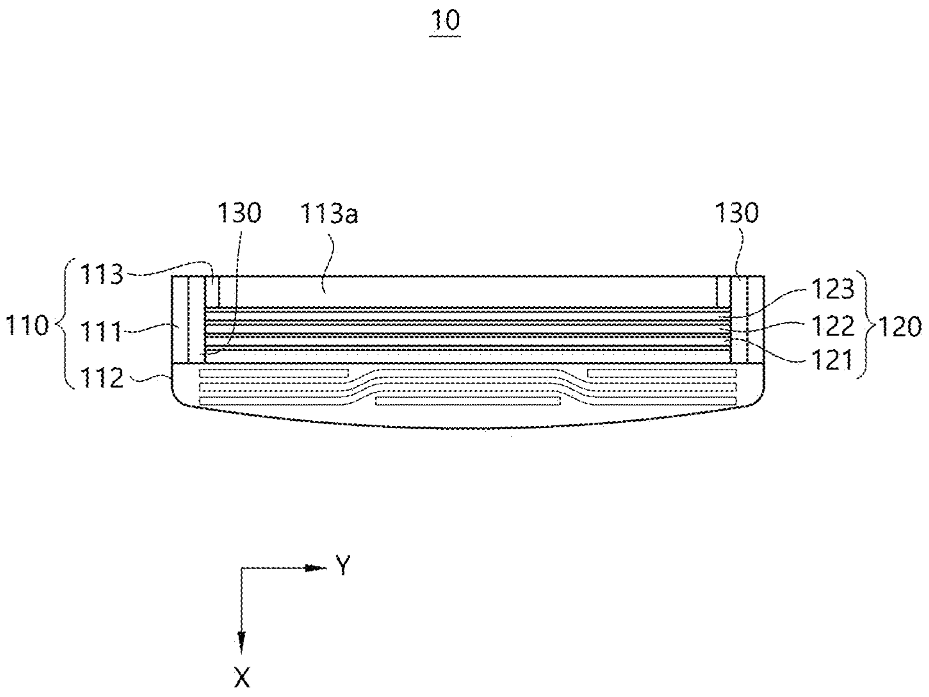
FIG. 2 is a plan view of a razor cartridge according to a first embodiment of the present disclosure.

FIG. 2 is a plan view of the razor cartridge 10 according to a first embodiment of the present disclosure.

Referring to FIG. 2, the razor cartridge 10 may include a blade housing 110 and blades 120.

The blade housing 110 may include a frame 111, a guard 112, and a cap 113.

With respect to the frame 111, the guard 112 is formed in front of the frame 111, and the cap 113 is formed in rear of the frame. Herein, the front indicates the positive X-axial direction in FIG. 2, and the rear indicates the negative X-axial direction in FIG. 2. The guard 112 and the cap 113 are formed long along a Y-axial direction.

The guard 112 adheres to a user's skin during a shaving process and pulls the skin, thereby improving the shaving benefit of the blade 120. To more effectively pull the user's skin, the guard 112 may have an embossed or engraved pattern on an upper surface thereof, and the upper surface of the guard 112 may be made of rubber, silicone, or the like material. The upper surface of the guard 112 corresponds to a front area in the upper surface of the blade housing 110.

The cap 113 may include a lubrication band 113*a* exposed on the upper surface of the blade housing 110. The lubrication band 113*a* includes a lubricating material, and applies the lubricating material onto a skin surface where the blade 120 has passed during the shaving process. The lubricating material may contain components for protecting the skin after shaving. The upper surface of the cap 113 corresponds to a rear area in the upper surface of the blade housing 110.

A shaving plane S may be defined as a virtual plane in contact with the upper surface of the guard 112 and the upper surface of the cap 113.

The frame 111 may include a central portion thereof formed open upwards.

The frame 111 accommodates each blade 120 therein longitudinally, and each blade 120 may be arranged in a row in a lateral direction with other blades 120. Herein, the longitudinal direction refers to a direction parallel to the Y axis in FIG. 2, and the lateral direction refers to a direction parallel to the X axis in FIG. 2.

The plurality of blades 120 may include a first blade 121 located at the frontmost side, a third blade 123 located at the rearmost side, and a second blade 122 located between the first blade 121 and the third blade 123.

FIG. 2 illustrates an example that the razor cartridge 10 includes three blades 121, 122 and 123, but the number of blades 120 may be varied depending on embodiments.

The frame 111 may include the handle coupling unit 114 (see FIG. 1) extending downward.

Referring to FIG. 2, the razor cartridge 10 may further include a clip 130. The clip 130 wraps around both sides of the frame 111 and attached to the blade housing 110. The clip 130 prevents the blade 120 from separating from the blade housing 110.

Figure 3:
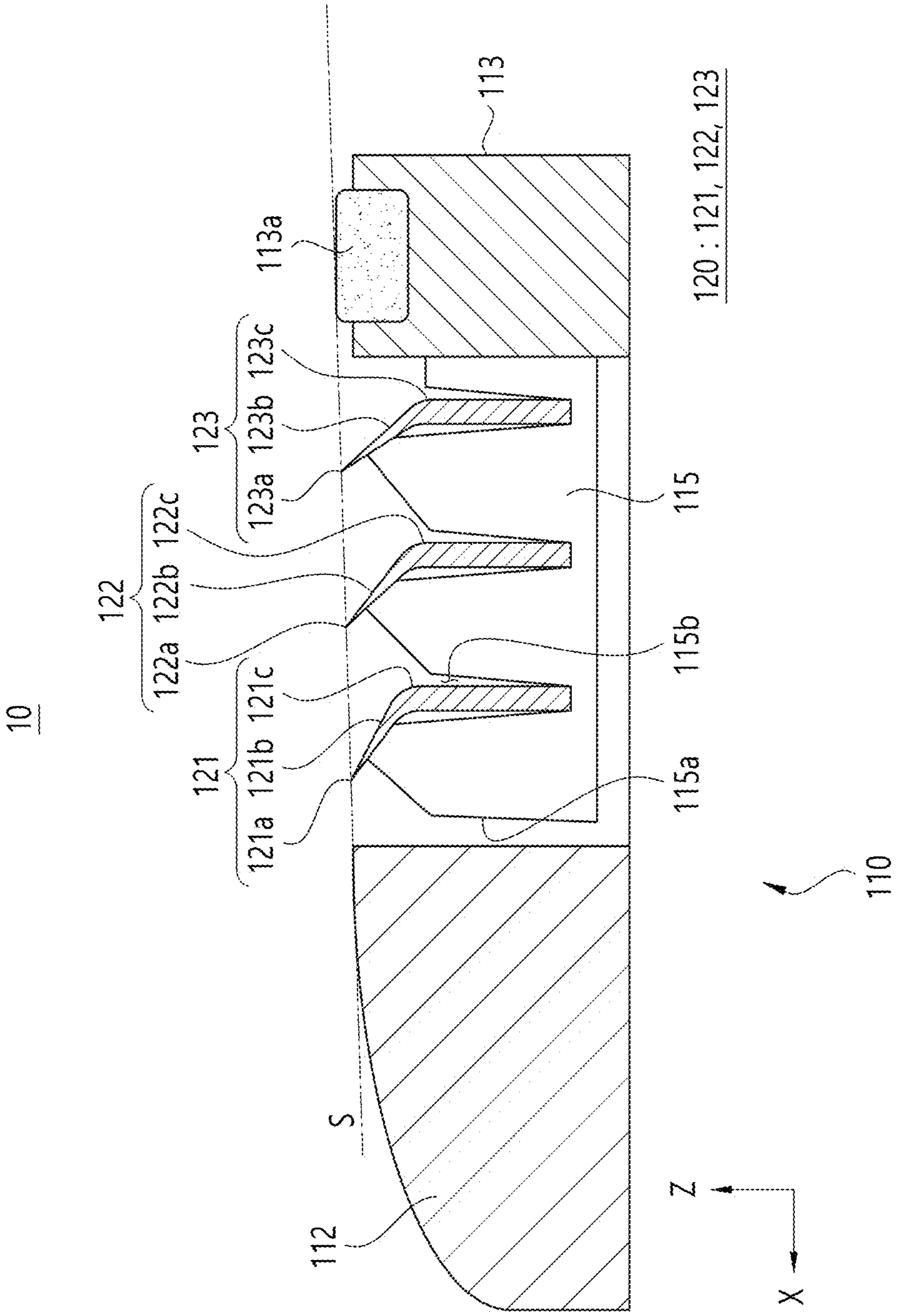
FIG. 3 is a schematic cross-sectional view of the razor cartridge according to the first embodiment of the present disclosure.

FIG. 3 is a schematic cross-sectional view of the razor cartridge 10 according to the first embodiment of the present disclosure. For convenience of explanation, the description will be made based on the razor cartridge 10 according to the first embodiment including three blades 121, 122, and 123. However, the description of the first blade 121 and the second blade 122 described below may also be commonly applied to the razor cartridge according to the embodiment including two blades.

Referring to FIG. 3, the blades 121, 122 and 123 may include cutting edges 121*a*, 122*a* and 123*a*, edge portions 121*b*, 122*b* and 123*b*, and base portions 121*c*, 122*c* and 123*c*, respectively.

The first blade 121 may include the first cutting edge 121*a*, the first edge portion 121*b*, and the first base portion 121*c*.

The first edge portion 121*b* may extend upward (Z direction) and forward (X direction) from the first base portion 121*c*, and the first cutting edge 121*a* may be formed at an end of the first edge portion 121*b*. The first cutting edge 121*a* may be formed by sharpening the end of the first edge portion 121*b* to cut body hair.

The second blade 122 may also include a second cutting edge 122*a*, a second edge portion 122*b*, and a second base portion 122*c* similar to the first blade 121, and the third blade 123 may also include a third cutting edge 123*a*, a third edge portion 123*b*, and a third base portion 123*c* similar to the first blade 121.

In FIG. 3, an integrated bending blade where the cutting edge, the edge portion, and the base portion are integrated is illustrated as an example of the blades 121, 122 and 123, but a welded blade where the edge portion including the cutting edge is welded to the base portion may be configured as the blade according to embodiments.

Referring to FIG. 3, the blade housing 110 may further include a blade support portion 115 for accommodating the blades 120.

The blade support portion 115 may include a support end 115*a* supporting the edge portions 121*b*, 122*b*, and 123*b* of each blade 120, and an accommodation groove 115*b* accommodating and supporting the base portions 121c, 122c, and 123c of each blade 120. The support end 115a may be configured to seat the edge portions 121b, 122b, and 123b, or may be configured to be adjacent to the edge portions 121b, 122b, and 123b. The accommodation groove 115b may be formed between adjacent support ends 115a.

The blade support portion 115 may be located between the guard 112 and the cap 113 and may be configured to accommodate and support both sides of each blade 120. Alternatively, the blade support portion 115 may be provided discontinuously in the longitudinal direction to accommodate and support both sides and the central portion of each blade 120. The blade support portion 115 may extend from the frame 111. Alternatively, the blade support portion 115 may extend from the guard 112 and/or the cap 113.

Although not shown, at least one washing hole penetrating vertically through the support end 115a may be formed in the blade support portion 115. Washing holes are formed between each blade 121, 122, and 123 to allow sludge generated during a shaving process to be easily discharged to the outside along with washing water.

The blade support portion 115 may be formed to have different heights. In this connection, the protrusion value of the cutting edges 121a, 122a, and 123a of each blade 120 with respect to the shaving plane S may be adjusted by using the step of the bottoms of the accommodation groove 115b.

The blades 120 are accommodated in the frame 111 such that at least a portion of the cutting edges 121a, 122a, and 123a are exposed to the upper surface of the blade housing 110 through the opened upper portion of the frame 111. The blades 120 are accommodated in the frame 111 so that the cutting edges 121a, 122a, and 123a face toward the front of the blade housing 110 (positive X-axis direction). Accordingly, the guard 112 is located in front of the cutting edges 121a, 122a, and 123a, and the cap 113 is located in rear of the cutting edges 121a, 122a, and 123a. Referring to FIG. 3, the blades 120 may be accommodated in the frame 111 so that the cutting edges 121a, 122a, and 123a of each blade 120 are located adjacent to the shaving plane S.

The first blade 121 is located between the second blade 122 and the guard 112, the second blade 122 is located between the first blade 121 and the cap 113 and also located between the third blade 123 and the guard 112, and the third blade 123 is located between the second blade 122 and the cap 113.

Figure 4:
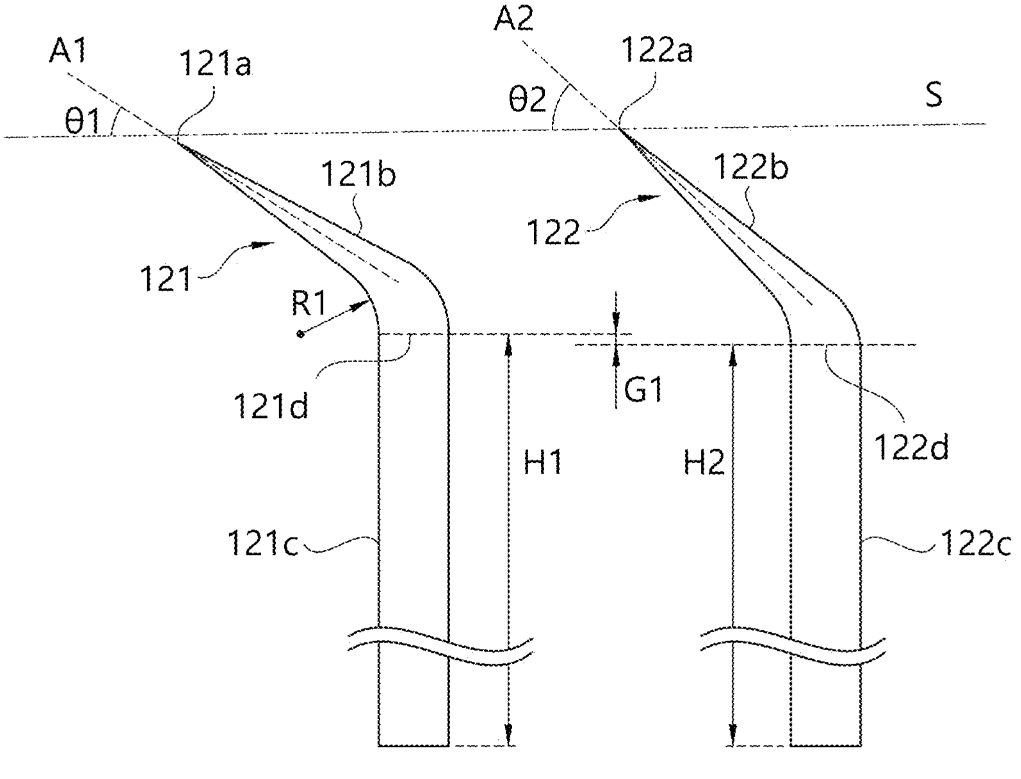
FIGS. 4 to 7 are diagrams for explaining the disposition relationship of blades of the razor cartridge according to the first embodiment of the present disclosure with respect to a shaving plane.
Figure 5:
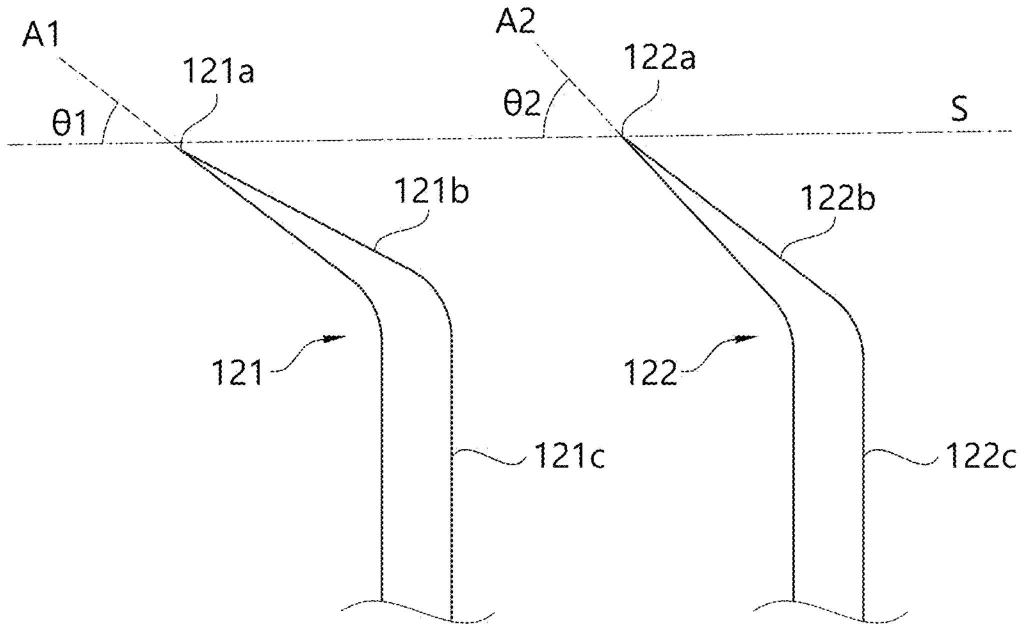
Figure 6:
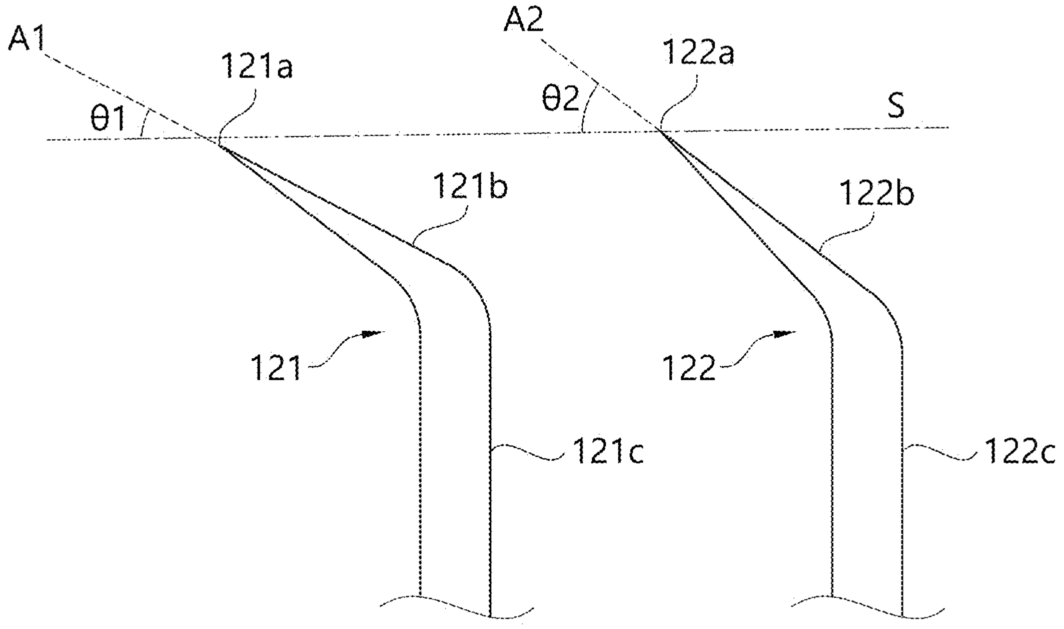

FIGS. 4 to 6 are diagrams for explaining the disposition relationship of the first blade 121 and the second blade 122 of the razor cartridge 10 according to the first embodiment of the present disclosure with respect to the shaving plane S.

Referring to FIG. 4, the first blade 121 is disposed so that a virtual line A1 extending from the first edge portion 121b forms an angle of θ1 with the shaving plane S. The A1 may mean an extension of the central axis of the first edge portion 121b that passes through the first cutting edge 121a.

The second blade 122 is disposed so that a virtual line A2 extending from the second edge portion 122b forms an angle of θ2 with the shaving plane S. The A2 may mean an extension of the central axis of the second edge portion 122b that passes through the second cutting edge 122a.

The first blade 121 and the second blade 122 may be formed or disposed so that θ1 is smaller than θ2.

The angles θ1 and θ2 between the shaving plane S and the virtual lines A1 and A2 extending from each edge portion 121b or 122b of the first blade 121 and the second blade 122 may be defined as a shave angle SA. The SA may mean an entering angle of the cutting edges 121a and 122a with respect to the shaving plane S, or may mean an entering angle of the cutting edges 121a and 122a with respect to a skin contact surface.

The SA is closely related to shaving feeling and shaving performance.

For example, when the SA is small, there is a high probability that the cutting edge does not directly contact the skin, providing a smooth shave with less irritation felt by the skin during a shaving process. However, since the cutting edge does not adhere closely to the skin, there is a high possibility that a clean shave will not be achieved.

On the other hand, when the SA is large, the cutting edge is in direct contact with the skin and the shave is performed, resulting in a clean shave, but the irritation felt by the skin becomes stronger.

In the razor cartridge according to this embodiment, at least some of the blades 121, 122, and 123 are disposed to have different SA, thereby reducing skin irritation during a shaving process and simultaneously achieving a clean shave.

In particular, the shaving angle θ1 of the first blade 121, which cuts the hair first in a shaving process, is formed to be smaller than the shaving angle θ2 of the second blade 122 that follows, so that skin irritation occurring during the initial cutting process of body hair by the first cutting edge 121a may be reduced.

Since the shaving angle θ2 of the second blade 122, which follows the first blade 121 and cuts body hair, is formed to be larger than the shaving angle θ1 of the first blade 121, so that the body hair remaining after being cut by the first blade 121 is cut more cleanly by the second cutting edge 122a, enabling a cleaner shave.

For example, the shaving angle θ1 of the first blade 121 may be determined within a range of 8 degrees to 23 degrees. The shaving angle θ2 of the second blade 122 may be formed to be larger than the shaving angle θ1 of the first blade 121 within the range of 15 degrees to 29 degrees (see Table 1, described later).

The shaving angles θ1 and 02 of each blade 121 or 122 may be related to a radius of curvature R1 of the edge portions 121b and 122b of each blade 121 or 122. As the radius of curvature of the edge portions 121b and 122b becomes smaller, the shaving angles θ1 and θ2 may become smaller. As the radius of curvature of the edge portions 121b and 122b becomes larger, the shaving angles θ1 and θ2 may become larger.

Accordingly, the radius of curvature of the edge portion 121b of the first blade 121 may be smaller than the radius of curvature formed by the edge portion 122b of the second blade 122.

When the cutting edge of the blade is located lower than the shaving plane S, the blade or cutting edge may be expressed as having a negative protrusion value. When the cutting edge of the blade is located on the shaving plane, the blade or cutting edge may be expressed as having a protrusion value of 0 or as being in a neutral state. When the cutting edge of the blade is located above the shaving plane, the blade or cutting edge may be expressed as having a positive protrusion value.

In general, a cutting edge with a negative protrusion value causes less shaving irritation, but it may be difficult to achieve a clean shave because it is difficult to cut body hair close to the skin. Conversely, a cutting edge with a positive protrusion value allows for a clean shave, but may cause severe shaving irritation due to contact with the skin.

Referring again to FIG. 4, the first blade 121 may be formed such that the first cutting edge 121a is located lower than the shaving plane S. As described above, the first blade

121 is formed to have the shaving angle θ1 to reduce shaving irritation, so when the first cutting edge 121*a* has a negative protrusion value, the benefit of reducing shaving irritation caused by the first blade 121 may be further increased. However, it is not limited thereto, and the first cutting edge 121*a* may be formed to have a protrusion value of 0 or a positive protrusion value.

The second cutting edge 122*a* may be located closer to the shaving plane S than the first cutting edge 121*a*. For example, the second cutting edge 122*a* may be disposed to have a protrusion value of 0. In this connection, the second cutting edge 122*a* may exhibit cleaner shaving performance than the first cutting edge 121*a*.

The angle between the first edge portion 121*b* and the first base portion 121*c* may be formed to be smaller than the angle between the second edge portion 122*b* and the second base portion 122*c* so that the shaving angle θ1 of the first cutting edge 121*a* is smaller than the shaving angle θ2 of the second cutting edge 122*a*.

In this connection, the first base portion 121*c* and the second base portion 122*c* may be disposed approximately in parallel.

Referring to FIG. 4, a boundary 121*d* between the first edge portion 121*b* and the first base portion 121*c* may be located above a boundary 122*d* between the second edge portion 122*b* and the second base portion 122*c* by a distance of G1. In other words, the boundary 121*d* between the first edge portion 121*b* and the first base portion 121*c* may be located closer to the shaving plane S than the boundary 122*d* between the second edge portion 122*b* and the second base portion 122*c*.

The boundaries 121*d* and 122*d* between the edge portions 121*b* and 122*b* and the base portions 121*c* and 122*c* of each blade 121 or 122 may be a point where bending begins. Alternatively, the boundaries 121*d* and 122*d* may be defined as a point where a side facing a different direction from the direction in which one side of the base portions 121*c* and 122*c* faces. Alternatively, the boundaries 121*d* and 122*d* may be defined as points where the thickness of a cross section parallel to the thickness direction of the base portions 121*c* and 122*c* is different from the thickness of the base portions 121*c* and 122*c* (for example, a point having a thickness greater than the thickness of the base portions 121*c* and 122*c*).

As described above, the shaving angle θ1 of the first cutting edge 121*a* is smaller than the shaving angle θ2 of the second cutting edge 122*a*.

Accordingly, when the lengths of the first edge portion 121*b* and the second edge portion 122*b* are formed to be approximately the same, the vertical distance (or shortest distance) between the boundary 121*d* between the first edge portion 121*b* and the first base portion 121*c* and the shaving plane S is shorter than the vertical distance (or shortest distance) between the boundary 122*d* between the second edge portion 122*b* and the second base portion 122*c* and the shaving plane S.

As a result, the boundary 121*d* between the first edge portion 121*b* and the first base portion 121*c* may be located above the boundary 122*d* between the second edge portion 122*b* and the second base portion 122*c* by a distance of G1.

Additionally, a vertical length H1 of the first base portion 121*c* may be longer than a vertical length H2 of the second base portion 122*c*.

For example, when the lower end of the first base portion 121*c* and the lower end of the second base portion 122*c* are located on the same horizontal plane, as described above, the boundary 121*d* between the first edge portion 121*b* and the first base portion 121*c* may be located above the boundary 122*d* between the second edge portion 122*b* and the second base portion 122*c* by a distance of G1. Accordingly, the vertical length H1 of the first base portion 121*c* may be formed to be longer than the vertical length H2 of the second base portion 122*c*.

Unlike the example shown in FIG. 4, the boundaries 121*d* and 122*d* of each blade 121 and 122 may be configured to be located at the same height. In this connection, the base portions 121*c* and 122*c* may be formed to have the same vertical length.

In this connection, when the lengths of the first edge portion 121*b* and the second edge portion 122*b* are the same, the shaving angle θ2 of the second cutting edge portion 122*a* is formed larger than the shaving angle θ1 of the first cutting edge 121*a*. Accordingly, the second cutting edge 122*a* is located above the first cutting edge 121*a*.

Conversely, when the length of the second edge portion 122*b* is configured to be shorter than the first edge portion 121*b*, the first cutting edge 121*a* and the second cutting edge 122*a* may be located at the same height.

In other words, when the boundaries 121*d* and 122*d* of each blade 121 and 122 are located at the same height, by adjusting the length of each edge portion 121*b* or 122*b*, the protrusion value of each cutting edge 121*a* or 122*a* with respect to the shaving plane S may be controlled.

Referring to FIG. 5, the first blade 121 is disposed so that the virtual line A1 extending from the lower surface of the first edge portion 121*b* or the first cutting edge 121*a* forms an angle of θ1 with the shaving plane S, and the second blade 122 is disposed so that the virtual line A2 extending from the lower surface of the second edge portion 122*b* or the second cutting edge 122*a* forms an angle of θ2 with the shaving plane S.

The angles θ1 and θ2 in FIG. 5 have the same reference numerals as the angles θ1 and θ2 in FIG. 4, but may be different angles.

FIG. 5 is a diagram to explain that the definition of the shaving angles θ1 and θ2 of each cutting edge 121*a* or 122*a* may be different from the example illustrated in FIG. 4. Since the description of the shaving angles θ1 and θ2 of each blade 121 or 122 overlaps with the description with reference to FIG. 4, further description thereof will be omitted.

Referring to FIG. 6, the first blade 121 is disposed so that the virtual line A1 extending from the upper surface of the first edge portion 121*b* or the first cutting edge 121*a* forms an angle of θ1 with the shaving plane S, and the second blade 122 is disposed so that the virtual line A2 extending from the upper surface of the second edge portion 122*b* or the second cutting edge 122*a* forms an angle of θ2 with the shaving plane S.

The angles θ1 and θ2 in FIG. 6 have the same reference numerals as the angles θ1 and θ2 in FIGS. 4 and 5, but may be different angles.

FIG. 6 is a diagram to explain that the definition of the shaving angles θ1 and θ2 of each cutting edge 121*a* or 122*a* may be different from the example illustrated in FIGS. 4 and 5. Since the description of the shaving angles θ1 and θ2 of each blade 121 or 122 overlaps with the description with reference to FIG. 4, further description thereof will be omitted.

For convenience of explanation, the disposition relationship between the first blade 121 and the second blade 122 has been described based on FIGS. 4 to 6, but at least some of the descriptions referring to FIGS. 4 to 6 may also be applied to the disposition relationship of any two blades disposed in succession among two or more blades in the razor cartridge. For example, the disposition relationship between the first blade 121 and the second blade 122 among the descriptions referring to FIGS. 4 to 6 may be applied to the second blade 122 and third blade 123 of the razor cartridge 10 illustrated in FIG. 3, respectively.

Figure 7:
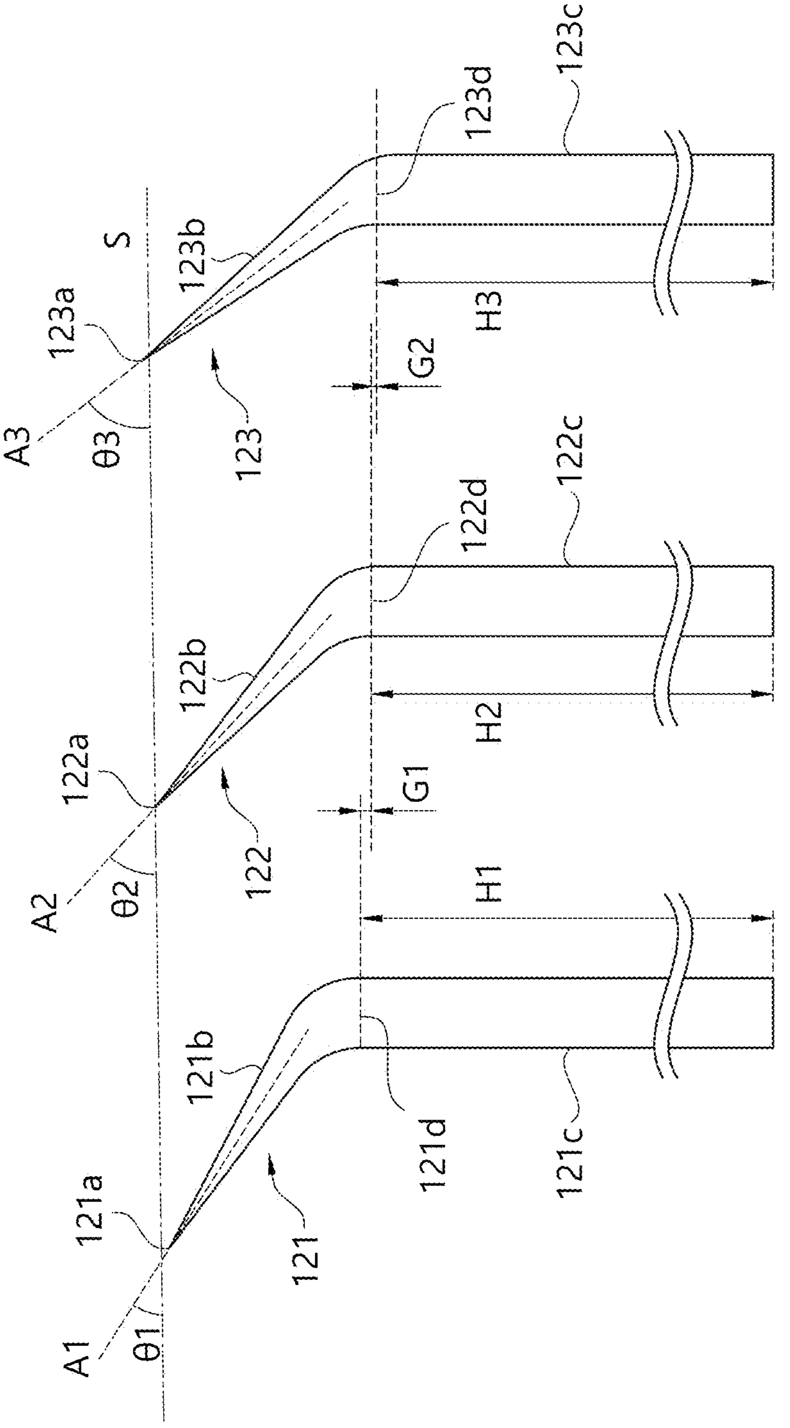

FIG. 7 is a diagram for explaining the disposition relationship of the blades 121, 122, and 123 of the razor cartridge 10 according to the first embodiment of the present disclosure with respect to the shaving plane S.

The disposition relationship between the first blade 121 and the second blade 122 has been described in detail with reference to FIGS. 4 to 6, and thus further description thereof will be omitted.

Referring to FIG. 7, the third blade 123 is disposed so that a virtual line A3 extending from the third edge portion 123*b* forms an angle of θ3 with the shaving plane S. The A3 may mean an extension of the central axis of the third edge portion 123*b* that passes through the third cutting edge 123*a*. The angle θ3 may be defined as the SA of the third blade 123.

The angle θ3 may be defined as the angle between the virtual line A3 extending from the third edge portion 123*b* and the shaving plane S, the angle between the shaving plane S and the virtual line extending from the lower surface of the third cutting edge 123*a* or the third edge portion 123*b* similar to what is described with reference to FIG. 5, or the angle between the shaving plane S and the virtual line extending from the upper surface of the third cutting edge 123*a* or the third edge portion 123*b* similar to what is described with reference to FIG. 6.

The second blade 122 and the third blade 123 may be disposed so that θ2 is equal to or smaller than θ3.

A shaving angle θ3 of the third blade 123 that follows the second blade 122 and cuts body hair is the same as the shaving angle θ2 of the second blade 122 or is formed larger than the shaving angle θ2 of the second blade 122 so that the body hair remaining after being cut by the second blade 122 is cut more cleanly by the third cutting edge 123*a*, enabling a cleaner shave.

The shaving angle θ3 of the third blade 123 may also be related to the radius of curvature of the third edge portion 123*b*. The radius of curvature of the third edge portion 123*b* may be larger than the radius of curvature formed by the edge portion 121*b* of the first blade 121, and may be greater than or equal to the radius of curvature formed by the edge portion 122*b* of the second blade 122.

Additionally, the third blade 123 may be formed such that the third cutting edge 123*a* is located above the shaving plane S. As described above, the third blade 123 is formed to have the shaving angle θ3 for clean shaving. When the third cutting edge 123*a* has a positive protrusion value, the benefit of providing clean shaving performance by the third blade 123 may be further increased. However, it is not limited thereto, and the third cutting edge 123*a* may be formed to have a protrusion value of 0 or a negative protrusion value.

The second blade 122 may be disposed so that the second cutting edge 122*a* has a protrusion value located between the first cutting edge 121*a* and the third cutting edge 123*a* with respect to the shaving plane S.

The angle between the third edge portion 123*b* and the third base portion 123*c* may be formed to be greater than the angle between the second edge portion 122*b* and the second base portion 122*c* so that the shaving angle θ3 of the third cutting edge 123*a* is greater than the shaving angle θ2 of the second cutting edge 122*a*. In this connection, the third base portion 123*c* may be disposed approximately parallel to the first base portion 121*c* and the second base portion 122*c*.

Referring to FIG. 7, when the shaving angle θ2 of the second cutting edge 122*a* is formed to be smaller than the shaving angle θ3 of the third cutting edge 123*a* and when the second edge portion 122*b* and the third edge portion 123*b* are formed to have approximately the same length, the vertical distance (or shortest distance) between the boundary 121*d* between the second edge portion 122*b* and the second base portion 122*c* and the shaving plane S is shorter than the vertical distance (or shortest distance) between the boundary 122*d* between the third edge portion 123*b* and the third base portion 123*c* and the shaving plane S.

Accordingly, the boundary 122*d* between the second edge portion 122*b* and the second base portion 122*c* may be located above the boundary 123*d* between the third edge portion 123*b* and the third base portion 123*c* by a distance of G2.

Referring to FIG. 7, when the lower end of the second base portion 122*c* and the lower end of the third base portion 123*c* are located on the same horizontal plane, as described above, the boundary 122*d* between the second edge portion 122*b* and the second base portion 122*c* may be located above the boundary 123*d* between the third edge portion 123*b* and the third base portion 123*c* by a distance of G1. Accordingly, the vertical length H2 of the second base portion 122*c* may be formed to be longer than a vertical length H3 of the third base portion 123*c*.

In addition, when the shaving angle θ3 of the third cutting edge 123*a* is formed to be larger than the shaving angle θ2 of the second cutting edge 122*a*, and when the lengths of the second edge portion 122*b* and the third edge portion 123*b* are the same, the third cutting edge 123*a* may be located above the second cutting edge 122*a*.

Conversely, when the length of the third edge portion 123*b* is configured to be shorter than the second edge portion 122*b*, the third cutting edge 123*a* and the second cutting edge 122*a* may be located at the same height.

Figure 8:
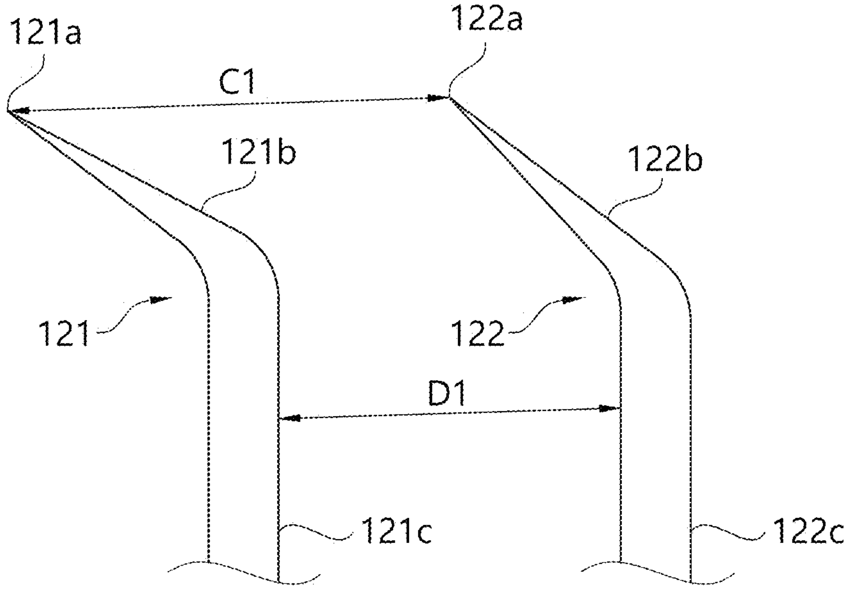
FIG. 8 is a diagram for explaining the gap between a first blade and a second blade of the razor cartridge according to the first embodiment of the present disclosure.

FIG. 8 is a diagram for explaining the gap between the first blade 121 and the second blade 122 of the razor cartridge 10 according to the first embodiment of the present disclosure.

Referring to FIG. 8, a gap C1 between the first cutting edge 121*a* and the second cutting edge 122*a* may be larger than a gap D1 between the first base portion 121*c* and the second base portion 122*c*. The gap D1 between the first base portion 121*c* and the second base portion 122*c* may be a distance measured in a direction parallel to a virtual straight line passing through the first cutting edge 121*a* and the second cutting edge 122*a*.

As described above, the shaving angle θ1 of the first cutting edge 121*a* is smaller than the shaving angle θ2 of the second cutting edge 122*a*.

Accordingly, when the first base portion 121*c* and the second base portion 122*c* are disposed approximately in parallel, the gap between the first edge portion 121*b* and the second edge portion 122*b* increases as the distance from the base portions 121*c* and 122*c* increases. As a result, the gap C1 between the first cutting edge 121*a* and the second cutting edge 122*a* becomes larger than the gap D1 between the first base portion 121*c* and the second base portion 122*c*.

When the shaving angle θ1 of the first cutting edge 121*a* and the shaving angle θ2 of the second cutting edge 122*a* are the same, and when the first base portion 121*c* and the second base portion 122*c* are disposed approximately in parallel, the gap C1 between the first cutting edge 121*a* and the second cutting edge 122*a* and the gap D1 between the first base portion 121*c* and the second base portion 122*c* are the same.

TABLE 1

| Disposition examples | θ1 (°) | θ2 (°) | Span (mm) | C1 (mm) | D1 (mm) | C1-D1 | C1/D1 |
|---|---|---|---|---|---|---|---|
| Disposition example 1 | 8.90 | 29.00 | 0.75 | 0.80 | 0.60 | 0.20 | 1.33 |
| Disposition example 2 | 8.90 | 29.00 | 1.15 | 1.19 | 0.99 | 0.19 | 1.19 |
| Disposition example 3 | 15.90 | 22.00 | 0.75 | 0.76 | 0.65 | 0.11 | 1.17 |
| Disposition example 4 | 15.90 | 22.00 | 0.95 | 0.95 | 0.84 | 0.11 | 1.13 |
| Disposition example 5 | 15.90 | 22.00 | 1.15 | 1.15 | 1.04 | 0.11 | 1.10 |
| Disposition example 6 | 8.90 | 15.00 | 0.75 | 0.76 | 0.65 | 0.10 | 1.16 |
| Disposition example 7 | 8.90 | 15.00 | 0.95 | 0.96 | 0.85 | 0.10 | 1.12 |
| Disposition example 8 | 8.90 | 15.00 | 1.15 | 1.15 | 1.05 | 0.10 | 1.10 |
| Disposition example 9 | 22.90 | 29.00 | 0.75 | 0.75 | 0.63 | 0.12 | 1.19 |
| Disposition example 10 | 22.90 | 29.00 | 0.95 | 0.95 | 0.83 | 0.12 | 1.14 |
| Disposition example 11 | 22.90 | 29.00 | 1.15 | 1.15 | 1.03 | 0.12 | 1.12 |
| Disposition example 12 | 12.52 | 32.73 | 0.95 | 0.99 | 0.66 | 0.33 | 1.50 |
| Disposition example 13 | 12.52 | 32.73 | 1.15 | 1.18 | 0.86 | 0.33 | 1.38 |
| Disposition example 14 | 19.52 | 25.73 | 0.96 | 0.96 | 0.77 | 0.19 | 1.25 |
| Disposition example 15 | 23.34 | 24.43 | 1.07 | 1.07 | 0.92 | 0.15 | 1.16 |
| Disposition example 16 | 24.43 | 25.13 | 0.95 | 0.95 | 0.81 | 0.14 | 1.18 |
| Disposition example 17 | 12.52 | 18.73 | 0.76 | 0.96 | 0.78 | 0.18 | 1.23 |
| Disposition example 18 | 16.34 | 17.43 | 0.87 | 0.87 | 0.73 | 0.14 | 1.20 |
| Disposition example 19 | 17.43 | 18.13 | 0.75 | 0.75 | 0.70 | 0.06 | 1.08 |
| Disposition example 20 | 26.52 | 32.73 | 1.16 | 1.16 | 0.96 | 0.20 | 1.21 |
| Disposition example 21 | 30.34 | 31.43 | 1.27 | 1.27 | 1.12 | 0.15 | 1.13 |
| Disposition example 22 | 31.43 | 32.13 | 1.15 | 1.15 | 1.01 | 0.14 | 1.14 |

TABLE 2

| Disposition examples | θ1 (°) | θ2 (°) | Span (mm) | C1 (mm) | D1 (mm) | C1-D1 | C1/D1 |
|---|---|---|---|---|---|---|---|
| Disposition example 1 | 8.90 | 29.00 | 0.75 | 0.98 | 0.78 | 0.20 | 1.25 |
| Disposition example 2 | 8.90 | 29.00 | 1.15 | 1.37 | 1.18 | 0.19 | 1.16 |
| Disposition example 3 | 15.90 | 22.00 | 0.75 | 0.86 | 0.75 | 0.11 | 1.15 |
| Disposition example 4 | 15.90 | 22.00 | 0.95 | 1.06 | 0.95 | 0.11 | 1.11 |
| Disposition example 5 | 15.90 | 22.00 | 1.15 | 1.26 | 1.15 | 0.11 | 1.09 |
| Disposition example 6 | 8.90 | 15.00 | 0.75 | 0.86 | 0.76 | 0.10 | 1.14 |
| Disposition example 7 | 8.90 | 15.00 | 0.95 | 1.06 | 0.95 | 0.10 | 1.11 |
| Disposition example 8 | 8.90 | 15.00 | 1.15 | 1.26 | 1.15 | 0.10 | 1.09 |
| Disposition example 9 | 22.90 | 29.00 | 0.75 | 0.83 | 0.71 | 0.12 | 1.17 |
| Disposition example 10 | 22.90 | 29.00 | 0.95 | 1.03 | 0.91 | 0.12 | 1.13 |
| Disposition example 11 | 22.90 | 29.00 | 1.15 | 1.20 | 1.08 | 0.12 | 1.11 |
| Disposition example 12 | 12.52 | 32.73 | 0.95 | 1.30 | 0.97 | 0.33 | 1.33 |
| Disposition example 13 | 12.52 | 32.73 | 1.15 | 1.50 | 1.17 | 0.32 | 1.28 |
| Disposition example 14 | 19.52 | 25.73 | 0.96 | 1.15 | 0.96 | 0.19 | 1.20 |
| Disposition example 15 | 23.34 | 24.43 | 1.07 | 1.22 | 1.07 | 0.15 | 1.14 |
| Disposition example 16 | 24.43 | 25.13 | 0.95 | 1.08 | 0.95 | 0.14 | 1.15 |
| Disposition example 17 | 12.52 | 18.73 | 0.76 | 1.14 | 0.96 | 0.18 | 1.19 |
| Disposition example 18 | 16.34 | 17.43 | 0.87 | 1.01 | 0.87 | 0.14 | 1.16 |
| Disposition example 19 | 17.43 | 18.13 | 0.75 | 0.89 | 0.75 | 0.14 | 1.19 |
| Disposition example 20 | 26.52 | 32.73 | 1.16 | 1.36 | 1.16 | 0.20 | 1.17 |
| Disposition example 21 | 30.34 | 31.43 | 1.27 | 1.42 | 1.27 | 0.15 | 1.12 |
| Disposition example 22 | 31.43 | 32.13 | 1.15 | 1.29 | 1.15 | 0.14 | 1.12 |

[Table 1] and [Table 2] summarize the results of actual measurements of C1 and D1 while variously changing the relative disposition between the first blade 121 and the second blade 122 so that the shaving angle θ1 of the first cutting edge 121*a* is smaller than the shaving angle θ2 of the second cutting edge 122*a*.

The disposition examples in [Table 1] and the disposition examples in [Table 2] have the same θ1, θ2, and span. In other words, disposition example 1 of [Table 1] and disposition example 1 of [Table 2] have the same θ1, θ2, and span. However, the span in [Table 1] is based on the cutting edge, and the span in [Table 2] is based on the base portion.

More specifically, the data in [Table 1] is a result measured by defining the horizontal distance between the first cutting edge 121*a* and the second cutting edge 122*a*, that is, the horizontal distance of the line extending in the vertical direction from the first cutting edge 121*a* and the line extending in the vertical direction from the second cutting edge 122*a*, as the span. The data in [Table 2] is a result measured by defining the horizontal distance between the first base portion 121*c* and the second base portion 122*c*, that is, the horizontal distance between the rear surface of the first base portion 121*c* and the front surface of the second base portion 122*c* facing each other, as the span.

The difference C1-D1 between the gap C1 between the first cutting edge 121*a* and the second cutting edge 122*a* and the gap D1 between the first base portion 121*c* and the second base portion 122*c* may be within the range of 0.01 to 0.35 mm.

The ratio C1/D1 of the gap C1 between the first cutting edge 121*a* and the second cutting edge 122*a* to the gap D1 between the first base portion 121*c* and the second base portion 122*c* may be within the range of 1.05 to 1.5.

For convenience of explanation, the gap between the first blade 121 and the second blade 122 has been described based on FIG. 8, but at least some of the descriptions with reference to FIG. 8 may also be applied to the gap of any two blades disposed in succession among two or more blades in the razor cartridge. For example, the gap between the second blade 122 and the third blade 123 of the razor cartridge 10 illustrated in FIG. 3 may be the same or similar to the gap between the first blade 121 and the second blade 122 in the descriptions with reference to FIG. 8.

Figure 9:
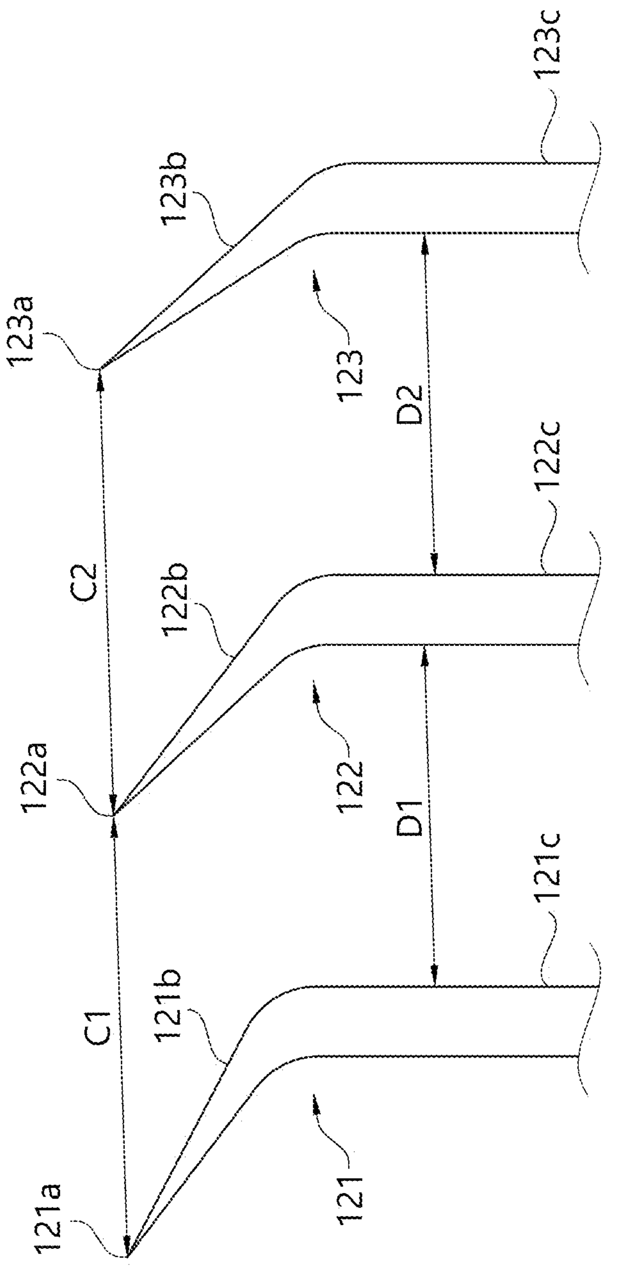
FIG. 9 is a diagram for explaining the gap between blades of the razor cartridge according to the first embodiment of the present disclosure.

FIG. 9 is a diagram for explaining the gap between the blades 121, 122, and 123 of the razor cartridge 10 according to the first embodiment of the present disclosure.

The first blade 121 and the second blade 122 have been described in detail with reference to FIG. 8, and thus further description thereof will be omitted.

Referring to FIG. 9, a gap C2 between the second cutting edge 122*a* and the third cutting edge 123*a* may be larger than a gap D2 between the second base portion 122*c* and the third base portion 123*c*. The gap D2 between the second base portion 122*c* and the third base portion 123*c* may be a distance measured in a direction parallel to a virtual straight line passing through the second cutting edge 122*a* and the third cutting edge 123*a*.

The shaving angle θ2 of the second cutting edge 122*a* may be smaller than the shaving angle θ3 of the third cutting edge 123*a*. When the second base portion 122*c* and the third base portion 123*c* are disposed appropriately in parallel, the gap between the second edge portion 122*b* and the third edge portion 123*b* increases as the distance from the base portions 122*c* and 123*c* increases. As a result, the gap C2 between the second cutting edge 122*a* and the third cutting edge 123*a* becomes larger than the gap D2 between the second base portion 122*c* and the third base portion 123*c*.

Figure 10:
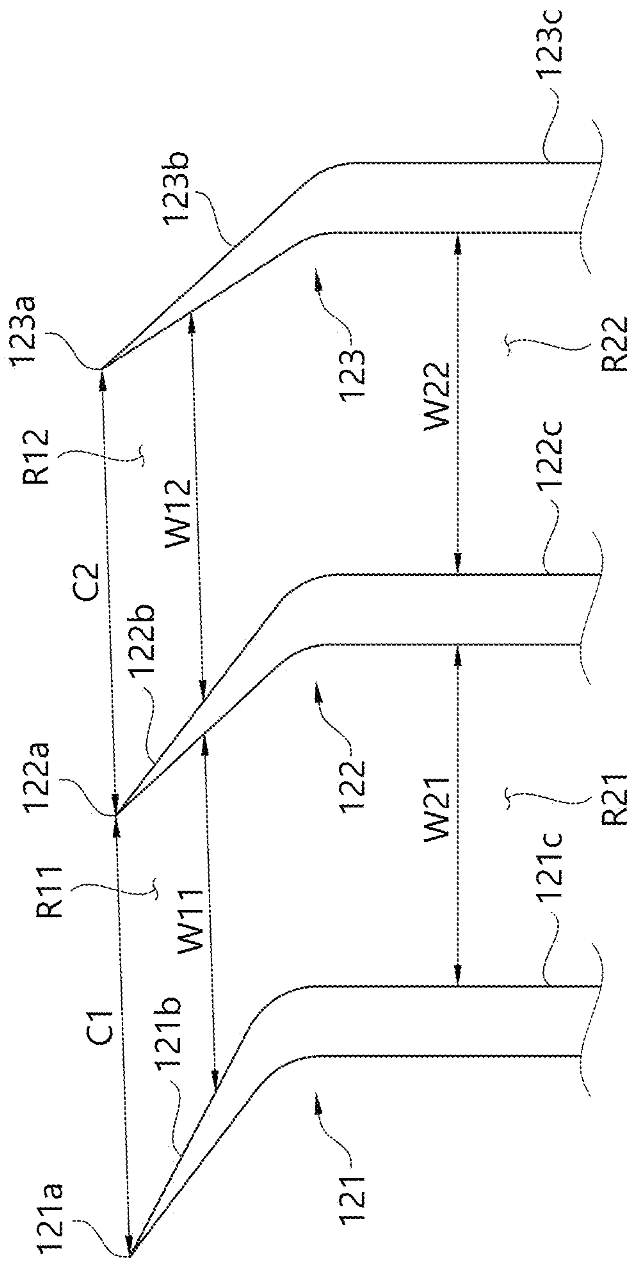
FIG. 10 is a diagram for explaining a rinsing channel formed between blades of the razor cartridge according to the first embodiment of the present disclosure.

FIG. 10 is a diagram for explaining a rinsing channel formed between the blades 121, 122, and 123 of the razor cartridge 10 according to the first embodiment of the present disclosure.

Referring to FIG. 10, space R11 and R21 between the first blade 121 and the second blade 122 and space R12 and R22 between the second blade 122 and the third blade 123 may form the rinsing channel. The rinsing channel forms a flow path through which shaving residue generated during a shaving process, such as shaving cream (or soap, cleansing foam), cut body hair, washing water, etc., is discharged to the outside of the razor cartridge 10.

The rinsing channels may be divided into first rinsing channels R11 and R12 and second rinsing channels R21 and R22.

The first rinsing channels R11 and R12 refer to the space between adjacent edge portions 121*b*, 122*b*, and 123*b*, and the second rinsing channels R21 and R22 refer to the space between adjacent base portions 121*c*, 122*c*, and 123*c*. More specifically, the space R11 between the first edge portion 121*b* and the second edge portion 122*b* and the space R12 between the second edge portion 122*b* and the third edge portion 123*b* each form a separate first rinsing channel. In addition, the space R21 between the first base portion 121*c* and the second base portion 122*c* forms a second rinsing channel communicating with the space R11 between the first edge portion 121*b* and the second edge portion 122*b*, and the space R22 between the second base portion 122*c* and the third base portion 123*c* forms a second rinsing channel communicating with the space R12 between the second edge portion 122*b* and the third edge portion 123*b*.

The first rinsing channels R11 and R12 include rinsing openings through which shaving residue flows. The rinsing opening may be defined as the space between adjacent cutting edges 121*a*, 122*a*, and 123*a*. More specifically, the space between the first cutting edge 121*a* and the second cutting edge 122*a* may be defined as a rinsing opening of the first rinsing channel R11 between the first edge portion 121*b* and the second edge portion 122*b*, and the space between the second cutting edge 122*a* and the third cutting edge 123*a* may be defined as a rinsing opening of the first rinsing channel R12 between the second edge portion 122*b* and the third edge portion 123*b*.

As described above, the shaving angle θ1 of the first cutting edge 121*a* is smaller than the shaving angle θ2 of the second cutting edge 122*a*.

Accordingly, a width W11 of the first rinsing channel R11 between the first edge portion 121*b* and the second edge portion 122*b* includes a gradually decreasing section from the rinsing opening toward the second rinsing channel R21 between the first base portion 121*c* and the second base portion 122*c*.

In addition, when the shaving angle θ2 of the second cutting edge 122*a* is formed to be smaller than the shaving angle θ3 of the third cutting edge 123*a*, a width W12 of the first rinsing channel R12 between the second edge portion 122*b* and the third edge portion 123*b* includes a gradually decreasing section from the rinsing opening toward the second rinsing channel R22 between the second base portion 122*c* and the third base portion 123*c*.

In other words, according to this embodiment, the rinsing openings of the first rinsing channels R11 and R12 may be configured to be wide. As a result, shaving residue easily flows into the first rinsing channels R11 and R12, thereby improving rinsing performance.

When the difference between θ2 and θ1 is greater than the difference between θ3 and θ2, the opening of the first rinsing channel R11 between the first edge portion 121*b* and the second edge portion 122*b* may be formed to be wider than the opening of the first rinsing channel R12 between the second edge portion 122*b* and the third edge portion 123*b*.

Conversely, when the difference between θ3 and θ2 is greater than the difference between θ2 and θ1, the opening of the first rinsing channel R12 between the second edge portion 122*b* and the third edge portion 123*b* may be formed to be wider than the opening of the first rinsing channel R11 between the first edge portion 121*b* and the second edge portion 122*b*.

Additionally, upon comparing disposition example 1 and disposition example 6 or disposition example 2 and disposition example 8 in [Table 1], it was identified that in the disposition example where the span and θ1 are the same but θ2 is larger, the value of C1-D1 was larger. In addition, upon comparing disposition example 1 and disposition example 9 in [Table 1], it was identified that in the disposition example where the span and θ2 are the same but θ1 is smaller, the value of C1-D1 was larger. The difference between C1 and D1 is associated with the difference in the width of the first rinsing channel R11 between the first edge portion 121*b* and the second edge portion 122*b* and the second rinsing channel R21 between the first base portion 121*c* and the second base portion 122*c*.

In other words, the relative size of the rinsing opening between each of the blades 121, 122, and 123 may be adjusted using the difference in the shaving angles θ1, θ2, and θ3.

When the first base portion 121*c*, the second base portion 122*c*, and the third base portion 123*c* are arranged parallel to each other, a width W21 of the second rinsing channel R21 between the first base portion 121*c* and the second base portion 122*c* and a width W22 of the second rinsing channel R22 between the second base portion 122*c* and the third base portion 123_c_ may each be formed to have a constant width as the distance from the first rinsing channel R11 or R12 increases.

In addition, even when the first base portion 121_c_, the second base portion 122_c_, and the third base portion 123_c_ are disposed at equal intervals from each other, according to this embodiment, rinsing performance may be improved by configuring the rinsing opening of the first rinsing channel R11 or R12 to be wide using a design in which at least some of the shaving angles θ1, θ2, and θ3 of each cutting edge 121_a_, 122_a_, and 123_a_ according to this embodiment are different.

Generally, razor cartridges are designed and manufactured so that the base portions of each blade are disposed at equal intervals from each other for convenience in the design and manufacturing process. Even though the blades 121, 122, and 123 according to this embodiment are installed in the blade housing designed so that the base portions of the blades are disposed at equal intervals from each other, the shaving angles θ1, θ2, and θ3 of each cutting edge 121_a_, 122_a_, and 123_a_ may be configured differently, and the rinsing openings of the first rinsing channels R11 and R12 may be configured to be wide, so that rinsing performance may be improved.

With reference to FIGS. 3 to 10, the description has been made based on the razor cartridge 10 including two blades 121 and 122 or three blades 121, 122, and 123, but depending on the embodiment, the number of blades may vary.

For example, when the razor cartridge 10 includes four blades, two first blades 121, one second blade 122, and one third blade 123 may be disposed in order; one first blade 121, two second blades 122, and one third blade 123 may be disposed in order; or one first blade 121, one second blade 122, and two third blades 123 may be disposed in order.

Alternatively, at least one of the first blade 121, the second blade 122, and the third blade 123 may be configured in a plural number, and the razor cartridge 10 may be configured to include five or more blades.

Hereinafter, a razor cartridge according to another embodiment will be described. For convenience of explanation, portions similar to the aforementioned embodiment are given the same reference numerals, and descriptions of portions common to the aforementioned embodiment are omitted.

Figure 11:
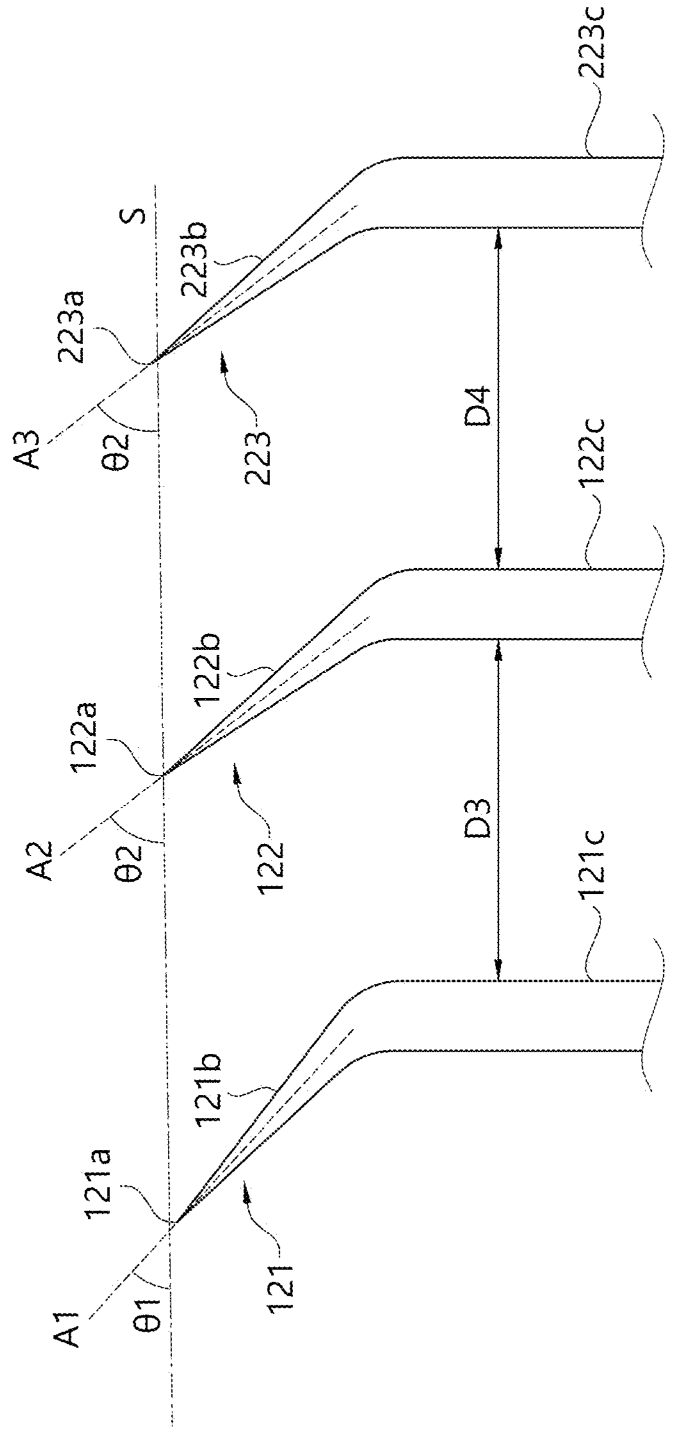
FIG. 11 is a diagram for explaining the disposition relationship of blades according to a second embodiment of the present disclosure.

FIG. 11 is a diagram for explaining the disposition relationship of the blades 121, 122, and 223 according to a second embodiment of the present disclosure.

The razor cartridge according to the second embodiment of the present disclosure includes the first blade 121, the second blade 122, and the third blade 223.

Referring to FIG. 11, the first blade 121 is disposed so that the virtual line A1 extending from the first edge portion 121_b_ forms an angle of θ1 with the shaving plane S, the second blade 122 is disposed so that the virtual line A2 extending from the second edge portion 122_b_ forms an angle of θ2 with the shaving plane S, and the third blade 223 is disposed so that the virtual line A3 extending from the third edge portion 223_b_ forms an angle of θ2 with the shaving plane S.

The blades 121, 122, and 123 according to the aforementioned first embodiment each form different shaving angles θ1, θ2, and θ3 with respect to the shaving plane S. However, in the blades 121, 122, and 223 according to the second embodiment, the second blade 122 and the third blade 223 form approximately the same shaving angle θ2 with respect to the shaving plane S, and only the first blade 121 form a different shaving angle θ1 with respect to the shaving plane S. The first blade 121 may be disposed so that θ1 is smaller than θ2.

FIG. 11 is an example of the virtual lines A1, A2, and A3 extending from each of the edge portions 121_b_, 122_b_, or 223_b_, and illustrates an extension of the central axis of each of the edge portions 121_b_, 122_b_, and 223_b_ that passes through each of the cutting edges 121_a_, 122_a_, and 223_a_. However, the virtual lines A1, A2, and A3 extending from each of the edge portions 121_b_, 122_b_, and 223_b_ may be a virtual line extending from the upper or lower surface of each of the edge portions 121_b_, 122_b_, and 223_b_ or each of the cutting edges 121_a_, 122_a_, and 223_a_, as described with reference to FIGS. 5 and 6.

In order to further increase the benefit of reducing shaving irritation by the first blade 121, the first blade 121 may be disposed so that the first cutting edge 121_a_ is located lower than the shaving plane S. However, it is not limited thereto, and the first cutting edge 121_a_ may be formed to have a protrusion value of 0 or a positive protrusion value.

In order to further increase the clean shaving benefit by the third blade 223, the third blade 223 may be disposed so that the third cutting edge 223_a_ is located above the shaving plane S. However, it is not limited thereto, and the third cutting edge 223_a_ may be formed to have a protrusion value of 0 or a negative protrusion value.

The second blade 122 may be disposed so that the second cutting edge 122_a_ has a protrusion value located between the first cutting edge 121_a_ and the third cutting edge 223_a_ with respect to the shaving plane S. For example, the second cutting edge 122_a_ may be disposed to have a protrusion value of 0. The second cutting edge 122_a_ may provide a cleaner shaving performance than the first cutting edge 121_a_ and provide a less irritating shaving feeling than the third cutting edge 223_a_.

As described above, the shaving angle θ1 of the first cutting edge 121_a_ is smaller than the shaving angle θ2 of the second cutting edge 122_a_.

Accordingly, when the first base portion 121_c_ and the second base portion 122_c_ are disposed approximately in parallel, the gap between the first cutting edge 121_a_ and the second cutting edge 122_a_ is larger than a gap D3 between the first base portion 121_c_ and the second base portion 122_c_.

However, according to this embodiment, the shaving angle θ2 of the second cutting edge 122_a_ and the third cutting edge 223_a_ is formed to be approximately the same. Accordingly, when the second blade 122 and the third blade 223 are formed substantially the same, and when the second base portion 122_c_ and the third base portion 223_c_ are disposed approximately in parallel, the gap between the second cutting edge 122_a_ and the third cutting edge 223_a_ may be approximately equal to a gap D4 between the second base portion 122_c_ and the third base portion 223_c_.

In addition, the shaving angle θ1 of the first cutting edge 121_a_ is formed to be smaller than the shaving angle θ2 of the second cutting edge 122_a_, and the shaving angle θ2 of the second cutting edge 122_a_ and the third cutting edge 223_a_ is formed to be approximately the same. Accordingly, the gap between the first cutting edge 121_a_ and the second cutting edge 122_a_ may be formed larger than the gap between the second cutting edge 122_a_ and the third cutting edge 223_a_.

In addition, the ratio of the gap between the second cutting edge 122_a_ and the third cutting edge 223_a_ to the gap between the first cutting edge 121_a_ and the second cutting edge 122_a_ may be configured to be greater than the ratio of the lateral gap between the second base portion 122_c_ and the third base portion 223*c* to the lateral gap between the first base portion 121*c* and the second base portion 122*c*.

According to this embodiment, the blades 121, 122, and 223 provide two types of shaving angles θ1, θ2, and θ2. Accordingly, the first cutting edge 121*a*, which forms a relatively small shaving angle θ1, is used to reduce skin irritation occurring during the initial cutting process of body hair, and the second cutting edge 122*a* and the third cutting edge 223*a*, which form a relatively large shaving angle θ2, are used to cleanly cut the remaining body hair after being cut by the first blade 121, thereby enabling a clean shave.

Figure 12:
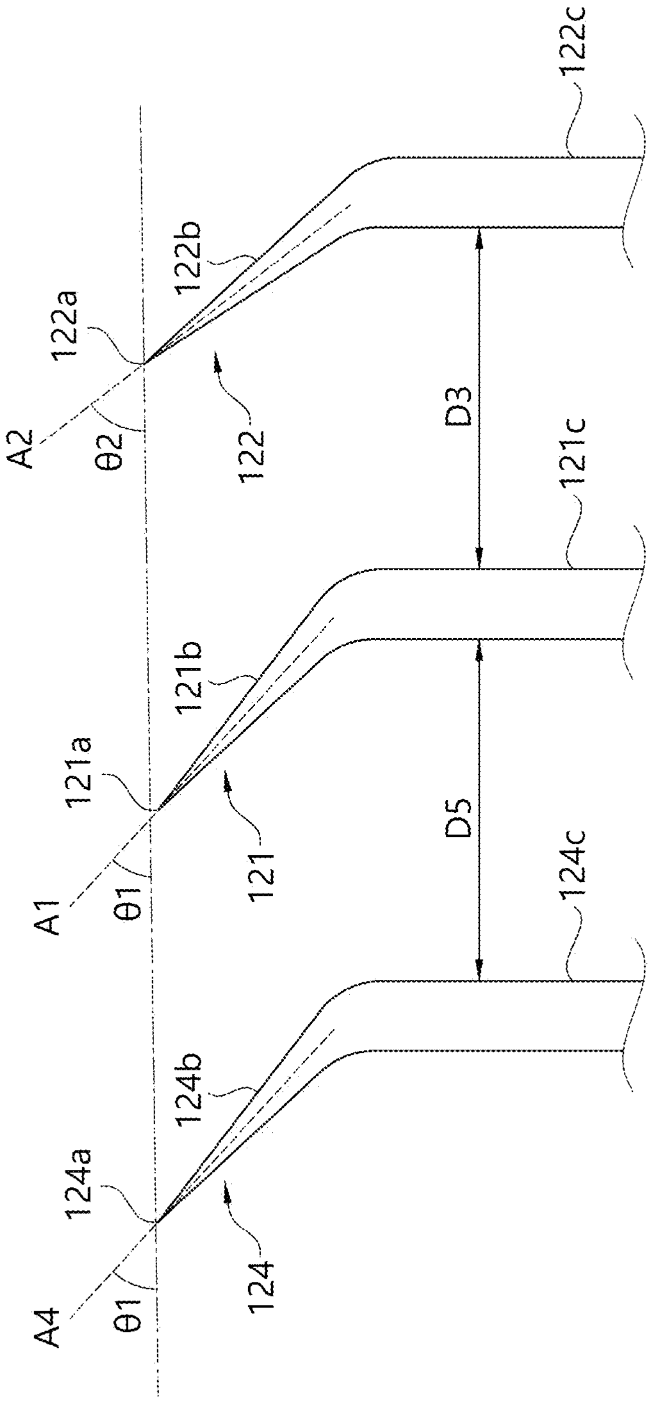
FIG. 12 is a diagram for explaining the disposition relationship of blades according to a third embodiment of the present disclosure.

FIG. 12 is a diagram for explaining the disposition relationship of blades according to a third embodiment of the present disclosure.

Referring to FIG. 12, the razor cartridge according to the third embodiment of the present disclosure includes a fourth blade 124, the first blade 121, and the second blade 122.

Since the first blade 121 and the second blade 122 are the same as those described in the aforementioned first and/or second embodiments, further description thereof will be omitted.

The fourth blade 124 is located in front of the first blade 121. In other words, the fourth blade 124 is located between the guard 112 (see FIG. 4) and the first blade 121.

Similar to the first blade 121, the fourth blade 124 includes a fourth cutting edge 124*a*, a fourth edge portion 124*b*, and a fourth base portion 124*c*.

Referring to FIG. 12, the fourth blade 124 is disposed so that a virtual line A4 extending from the first edge portion 124*b* forms an angle of θ1 with the shaving plane S. In other words, the fourth blade 124 and the first blade 121 form approximately the same shaving angle θ1 with respect to the shaving plane S, and only the second blade 122 has a different shaving angle θ2 with respect to the shaving plane S. The fourth blade 124, the first blade 121, and the second blade 122 may be disposed so that θ1 is smaller than θ2.

FIG. 12 is an example of the virtual lines A1, A2, and A3 extending from each of the edge portions 121*b*, 122*b*, and 124*b*, and illustrates an extension of the central axis of each of the edge portions 121*b*, 122*b*, and 124*b* that passes through each of the cutting edges 121*a*, 122*a*, and 124*a*. However, the virtual lines A1, A2, and A3 extending from each of the edge portions 121*b*, 122*b*, and 124*b* may be a virtual line extending from the upper or lower surface of each of the edge portions 121*b*, 122*b*, and 124*b* or each of the cutting edges 121*a*, 122*a*, and 124*a*, as described with reference to FIGS. 5 and 6.

In order to further increase the benefit of reducing shaving irritation by the fourth blade 124, the fourth blade 124 may be disposed so that the fourth cutting edge 124*a* is located lower than the shaving plane S. However, it is not limited thereto, and the fourth cutting edge 124*a* may be formed to have a protrusion value of 0 or a positive protrusion value.

In order to further increase the clean shaving benefit by the second blade 122, the second blade 122 may be disposed so that the second cutting edge 122*a* is located above the shaving plane S. However, it is not limited thereto, and the second cutting edge 122*a* may be formed to have a protrusion value of 0 or a negative protrusion value.

The first blade 121 may be disposed so that the first cutting edge 121*a* has a protrusion value located between the fourth cutting edge 124*a* and the second cutting edge 122*a* with respect to the shaving plane S. For example, the first cutting edge 121*a* may be disposed to have a protrusion value of 0. The first cutting edge 121*a* may provide a cleaner shaving performance than the fourth cutting edge 124*a* and provide a less irritating shaving feeling than the second cutting edge 122*a*.

As described above, the shaving angle θ1 of the first cutting edge 121*a* and the fourth cutting edge 124*a* is smaller than the shaving angle θ2 of the second cutting edge 122*a*.

Accordingly, the gap between the first cutting edge 121*a* and the second cutting edge 122*a* may be formed to be larger than the gap between the first cutting edge 121*a* and the fourth cutting edge 124*a*.

As such, when the first blade 121 and the fourth blade 124 are formed substantially the same, and when the first base portion 121*c* and the fourth base portion 124*c* are disposed approximately in parallel, the gap between the first cutting edge 121*a* and the fourth cutting edge 124*a* may be approximately equal to a gap D5 between the first base portion 121*c* and the fourth base portion 124*c*.

In addition, the ratio of the gap between the first cutting edge 121*a* and the fourth cutting edge 124*a* to the gap between the first cutting edge 121*a* and the second cutting edge 122*a* may be configured to be smaller than the ratio of the lateral gap between the first base portion 121*c* and the fourth base portion 124*c* to the lateral gap between the first base portion 121*c* and the second base portion 122*c*.

Figure 13:
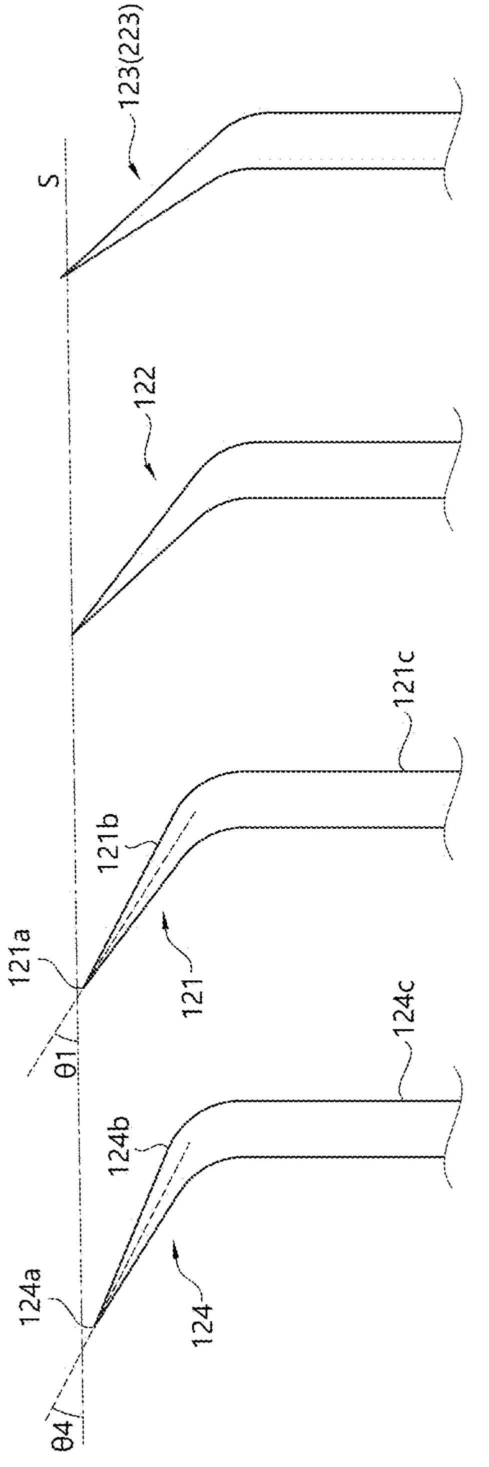
FIG. 13 is a diagram for explaining the disposition relationship of blades according to a fourth embodiment of the present disclosure.

FIG. 13 is a diagram for explaining the disposition relationship of blades 121, 122 and 123 or 223, and 124 according to a fourth embodiment of the present disclosure.

The razor cartridge according to the fourth embodiment of the present disclosure includes the first blade 121, the second blade 122, the third blade 123 or 223, and the fourth blade 124.

Since the first blade 121, the second blade 122, and the third blade 123 or 223 are the same as those described in the aforementioned first and/or second embodiments, further description thereof will be omitted.

Referring to FIG. 13, the fourth blade 124 is located in front of the first blade 121. In other words, the fourth blade 124 is located between the guard 112 (see FIG. 3) and the first blade 121.

Similar to the first blade 121, the fourth blade 124 includes the fourth cutting edge 124*a*, the fourth edge portion 124*b*, and the fourth base portion 124*c*.

Referring to FIG. 13, the first blade 121 is disposed so that the virtual line A1 extending from the first edge portion 121*b* forms an angle of θ1 with the shaving plane S, and the fourth blade 124 is disposed so that the virtual line A4 extending from the first edge portion 121*b* forms an angle of θ4 with the shaving plane S.

FIG. 13 is an example of the virtual lines A1 and A4 extending from each of the edge portions 121*b* and 124*b*, and illustrates an extension of the central axis of each of the edge portions 121*b* and 124*b* that passes through each of the cutting edges 121*a* and 124*a*. However, the virtual lines A1 and A4 extending from each of the edge portions 121*b* and 124*b* may be a virtual line extending from the upper or lower surface of each of the edge portions 121*b* and 124*b* or each of the cutting edges 121*a* and 124*a*, as described with reference to FIGS. 5 and 6.

The shaving angle θ4 of the fourth blade 124 may be smaller than the shaving angle θ1 of the first blade 121.

In this connection, the fourth cutting edge 124*a* of the fourth blade 124 may cut body hair with less shaving irritation than that of the first blade 121. In order to improve the benefit of reducing shaving irritation caused by the fourth blade 124, the fourth cutting edge 124*a* may be disposed to have a negative protrusion value. For example, the fourth cutting edge 124*a* may be located lower than the first cutting edge 121*a* from the shaving plane S. However, it is not limited thereto, and the fourth cutting edge 124*a* may be formed to have a protrusion value of 0 or a positive protrusion value.

In this connection, the shaving angle θ4 of the fourth cutting edge 124*a* is formed to be smaller than the shaving angle θ1 of the first cutting edge 121*a*. Accordingly, when the first base portion 121*c* and the fourth base portion 124*c* are disposed approximately in parallel, the gap between the first cutting edge 121*a* and the fourth cutting edge 124*a* becomes larger than the gap between the first base portion 121*c* and the fourth base portion 124*c*.

Alternatively, the shaving angle θ4 of the fourth blade 124 may be formed to be larger than the shaving angle θ1 of the first blade 121. In this connection, the fourth cutting edge 124*a* of the fourth blade 124 provides cleaner shaving performance compared to the first cutting edge 121*a*, and thus may compensate for the deterioration in shaving performance caused by the first cutting edge 121*a*.

In this connection, in order to reduce shaving irritation caused by the fourth cutting edge 124*a*, the fourth cutting edge 124*a* may be disposed to have a negative protrusion value. For example, the fourth cutting edge 124*a* may be located lower than the first cutting edge 121*a* from the shaving plane S. However, it is not limited thereto, and the fourth cutting edge 124*a* may be formed to have a protrusion value of 0 or a positive protrusion value.

In this connection, the shaving angle θ4 of the fourth cutting edge 124*a* is formed to be larger than the shaving angle θ1 of the first cutting edge 121*a*. Accordingly, when the first base portion 121*c* and the fourth base portion 124*c* are disposed approximately in parallel, the gap between the first cutting edge 121*a* and the fourth cutting edge 124*a* becomes smaller than the gap between the first base portion 121*c* and the fourth base portion 124*c*.

Figure 14:
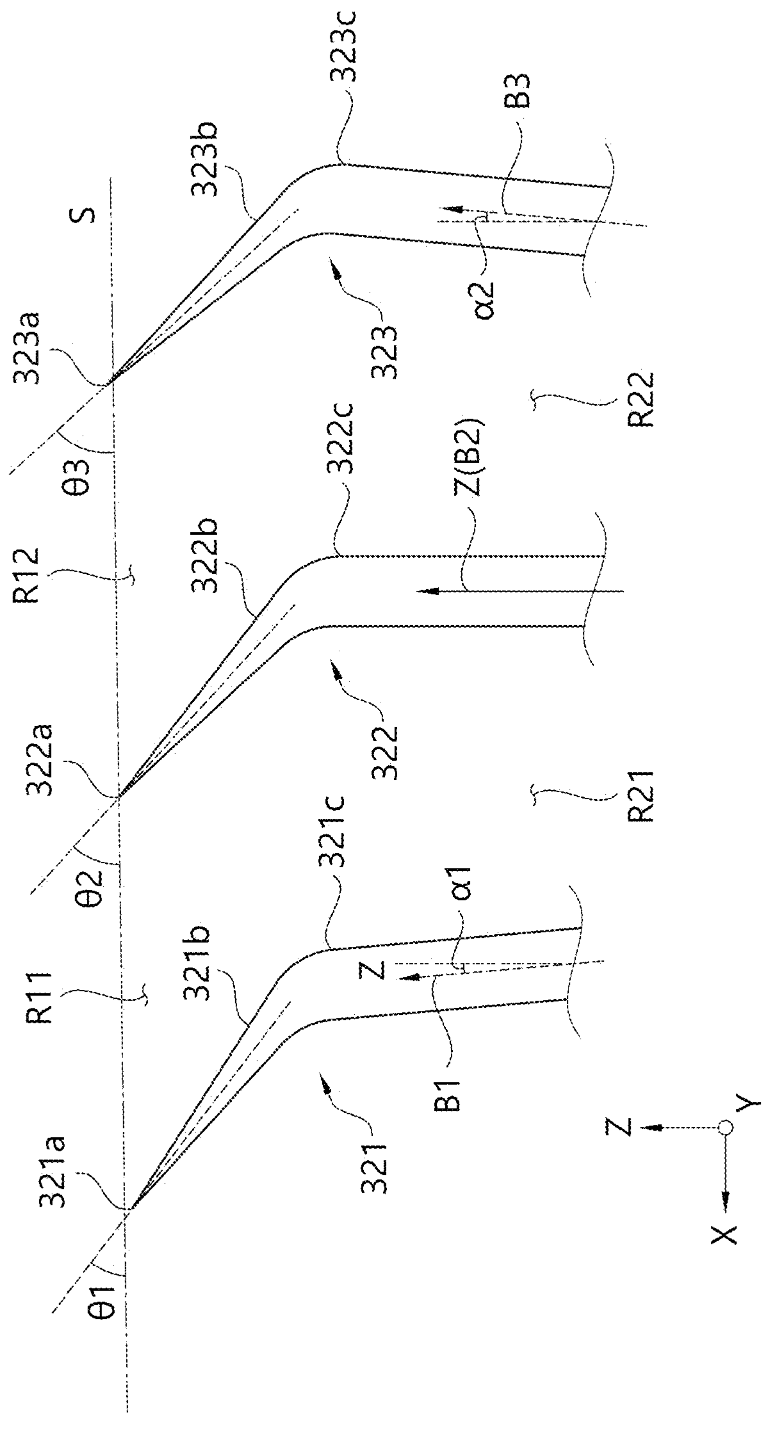
FIG. 14 is a diagram for explaining the disposition relationship of blades according to a fifth embodiment of the present disclosure.

FIG. 14 is a diagram for explaining the disposition relationship of blades 321, 322, and 323 according to a fifth embodiment of the present disclosure.

The razor cartridge according to the fifth embodiment of the present disclosure includes a first blade 321, a second blade 322, and a third blade 323.

The first blade 321 may include a first cutting edge 321*a*, a first edge portion 321*b*, and a first base portion 321*c*.

The first edge portion 321*b* may extend upward (Z direction) and forward (X direction) from the first base portion 321*c*, and the first cutting edge 321*a* may be formed at an end of the first edge portion 321*b*. The first cutting edge 321*a* may be formed by sharpening the end of the first edge portion 321*b* to cut body hair.

The second blade 322 may also include a second cutting edge 322*a*, a second edge portion 322*b*, and a second base portion 322*c* similar to the first blade 321, and the third blade 323 may also include a third cutting edge 323*a*, a third edge portion 323*b*, and a third base portion 323*c* similar to the first blade 321.

Referring to FIG. 14, the first blade 321 is disposed so that a virtual line extending from the first edge portion 321*b* forms an angle of θ1 with the shaving plane S, the second blade 322 is disposed so that a virtual line extending from the second edge portion 322*b* forms an angle of θ2 with the shaving plane S, and the third blade 323 is disposed so that a virtual line extending from the third edge portion 323*b* forms an angle of θ3 with the shaving plane S.

FIG. 14 is an example of the virtual lines extending from each of the edge portions 321*b*, 322*b*, and 323*b*, and illustrates an extension of the central axis of each of the edge portions 321*b*, 322*b*, and 323*b* that passes through each of the cutting edges 321*a*, 322*a*, and 323*a*. However, the virtual lines extending from each of the edge portions 321*b*, 322*b*, and 323*b* may be a virtual line extending from the upper or lower surface of each of the edge portions 321*b*, 322*b*, and 323*b* or each of the cutting edges 321*a*, 322*a*, and 323*a*, as described with reference to FIGS. 5 and 6.

The first blade 121 and the second blade 122 may be disposed so that θ1 is smaller than θ2, and the second blade 122 and the third blade 123 may be disposed so that θ2 is smaller than θ3. Since the benefit thereof has been described in detail in the aforementioned embodiments, further description thereof will be omitted. In addition, since the angle ranges of θ1, θ2, and θ3 have been described in detail in the aforementioned embodiments, further description thereof will be omitted.

In order to further increase the benefit of reducing shaving irritation by the first blade 321, the first blade 321 may be disposed so that the first cutting edge 321*a* is located lower than the shaving plane S. However, it is not limited thereto, and the first cutting edge 321*a* may be formed to have a protrusion value of 0 or a positive protrusion value.

In order to further increase the clean shaving benefit by the third blade 323, the third blade 323 may be disposed so that the third cutting edge 323*a* is located above the shaving plane S. However, it is not limited thereto, and the third cutting edge 323*a* may be formed to have a protrusion value of 0 or a negative protrusion value.

The second blade 322 may be disposed so that the second cutting edge 322*a* has a protrusion value located between the first cutting edge 321*a* and the third cutting edge 323*a* with respect to the shaving plane S. For example, the second cutting edge 322*a* may be disposed to have a protrusion value of 0. The second cutting edge 322*a* may provide a cleaner shaving performance than the first cutting edge 321*a* and provide a less irritating shaving feeling than the third cutting edge 323*a*.

The blades 321, 322, and 323 according to this embodiment may be manufactured to have the same shape. However, in order that the shaving angle θ1 of the first cutting edge 321*a*, the shaving angle θ2 of the second cutting edge 322*a*, and the shaving angle θ3 of the third cutting edge 323*a* form different angles, each of the blades 321, 322, and 323 may be disposed not parallel to each other.

Referring to FIG. 14, the second blade 322 is disposed so that a central axis B2 of the second base portion 322*c* is parallel to a Z axis. However, the first blade 321 is disposed such that the central axis B1 of the first base portion 321*c* is not parallel to the Z axis, and the third blade 323 is also disposed such that a central axis B3 of the third base portion 323*c* is not parallel to the Z axis.

More specifically, the first blade 321 may be rotated counterclockwise about a Y axis by an angle of α1 compared to the second blade 322. Additionally, the third blade 323 may be rotated clockwise about the Y axis by an angle of α2 compared to the second blade 322.

Accordingly, even when the blades 321, 322, and 323 are manufactured to have the same shape, the shaving angle θ1 of the first cutting edge 321*a* becomes smaller than the shaving angle θ2 of the second cutting edge 322*a*, and the shaving angle θ3 of the third cutting edge 323*a* becomes larger than the shaving angle θ2 of the second cutting edge 322*a*.

In FIG. 14, the second blade 322 shows an example in which the central axis B2 of the second base portion 322*c* is disposed parallel to the Z axis, without being limited thereto, and the central axis B2 of the second base portion 322*c* may not be disposed parallel to the Z axis. Alternatively, according to an embodiment, the central axis B1 of the first base portion 321*c* or the central axis B3 of the third base portion 323*c* may be disposed parallel to the Z-axis.

In addition, the gap between the first blade 321 and the second blade 322 gradually narrows as moving from the cutting edges 321*a* and 322*a* to the base portions 321*c* and 322*c*. Accordingly, the gap between the first cutting edge 321*a* and the second cutting edge 322*a* becomes larger than the gap between the first base portion 321*c* and the second base portion 322*c*.

The gap between the second blade 322 and the third blade 323 also gradually narrows as moving from the cutting edges 322*a* and 323*a* to the base portions 322*c* and 323*c*. Accordingly, the gap between the second cutting edge 322*a* and the third cutting edge 323*a* becomes larger than the gap between the second base portion 322*c* and the third base portion 323*c*.

In addition, the space R11 and R21 between the first blade 321 and the second blade 322 and space R12 and R22 between the second blade 322 and the third blade 323 may form the rinsing channel. The rinsing channels may be divided into the first rinsing channels R11 and R12 and the second rinsing channels R21 and R22.

A width of the first rinsing channel R11 between the first edge portion 321*b* and the second edge portion 322*b* includes a gradually decreasing section from the rinsing opening toward the second rinsing channel R21 between the first base portion 321*c* and the second base portion 322*c*. In addition, a width of the second rinsing channel R21 between the first base portion 321*c* and the second base portion 322*c* includes a section that becomes smaller as going farther from the first rinsing channel R11.

A width of the first rinsing channel R12 between the second edge portion 322*b* and the third edge portion 323*b* includes a gradually decreasing section from the rinsing opening toward the second rinsing channel R22 between the second base portion 322*c* and the third base portion 323*c*. In addition, a width of the second rinsing channel R22 between the second base portion 322*c* and the third base portion 323*c* includes a section that becomes smaller as going farther from the first rinsing channel R12.

In this embodiment, the description is made based on a configuration including three blades 321, 322, and 323 having different shaving angles θ1, θ2, and θ3. However, similar to the embodiment described with reference to FIGS. 11 and 12, two of the three blades 321, 322, and 323 may be configured to have the same shaving angle. Alternatively, an embodiment of the present disclosure may be configured to include four or more blades, in which case two first blades 321, one second blade 322 and one third blade 323 may be disposed in order; one first blade 321, two second blades 322, and one third blade 323 may be disposed in order; or one first blade 321, one second blade 322, and two third blades 323 may be disposed in order. Alternatively, at least one of the first blade 321, the second blade 322, and the third blade 323 may be configured in a plural number, and the razor cartridge may be configured to include five or more blades.

As described above, the razor cartridge according to various embodiments of the present disclosure include blades forming at least two or more shaving angles SA to reduce skin irritation during a shaving process and simultaneously achieve a clean shave.

In addition, at least some of the blades according to the aforementioned embodiments may be used as asymmetric blades in which a facing edge in contact with the skin and a non-facing edge located on the opposite side of the facing edge are formed asymmetrically. In this connection, the benefit of relieving skin irritation using the asymmetric blade is added to the benefit of relieving skin irritation using a difference in shaving angles of the blades described in this specification, and the benefit of relieving skin irritation is doubled, providing a comfortable shaving feeling to a user.

In addition, at least some of the blades according to the aforementioned embodiments may be blades in which a hard thin film layer of CrB component is laminated on a base material and a resin coating layer for reducing friction is laminated on the hard thin film layer.

Those skilled in the technical field to which the present disclosure pertains will understand that the present disclosure may be practiced in other detailed forms without departing from the technical spirit or essential features of the present disclosure. Therefore, it should be understood that the above-described embodiments are exemplary in all aspects rather than being restrictive. The scope of the present disclosure is defined by the following claims rather than by the preceding description. It should be interpreted that all changes or modifications derived from the meaning and scope of the claims and their equivalents are included in the scope of the present disclosure.

What is claimed is:

1. A razor cartridge, comprising:

a first blade comprising a first base portion and a first edge portion forming a predetermined angle with the first base portion and having a first cutting edge;

a second blade arranged in a same direction as and located adjacent to the rear of the first blade, the second blade comprising a second base portion and a second edge portion forming a predetermined angle with the second base portion and having a second cutting edge;

a third blade arranged in a same direction as and located adjacent to the rear of the second blade, the third blade comprising a third base portion and a third edge portion having a third cutting edge, wherein the first cutting edge, the second cutting edge, and the third cutting edge are bent toward a guard; and a blade housing comprising a guard and a cap defining a shaving plane, the blade housing accommodating the first blade, the second blade and the third blade such that the first cutting edge, the second cutting edge and the third cutting edge are exposed toward the front of the blade housing between the guard and the cap, wherein a first gap between the first cutting edge and the second cutting edge is greater than a first lateral gap between the first base portion and the second base portion, measured along a direction parallel to a virtual straight line passing through the first cutting edge and the second cutting edge, wherein the first gap is greater than a second gap between the second cutting edge and the third cutting edge, based on a difference between an angle formed by the first edge portion with respect to the first base portion and an angle formed by the second edge portion with respect to the second base portion, wherein the first lateral gap is substantially equal to a second lateral gap between the second base portion and the third base portion, wherein a ratio of the second gap to the first gap is smaller than a ratio of the second lateral gap to the first lateral gap, wherein a space between the first edge portion and the second edge portion and a space between the second edge portion and the third edge portion collectively form a first rinsing channel, and a space between the first base portion and the second base portion and a space between the second base portion and the third base portion collectively form a second rinsing channel in communication with the first rinsing channel, wherein the first rinsing channel comprises a rinsing opening defined as a space between the first cutting edge and the second cutting edge and a space between the second cutting edge and the third cutting edge, and a width of the first rinsing channel gradually decreases in a direction from the rinsing opening toward the second rinsing channel, and wherein a protrusion value of the first cutting edge is different form a protrusion value of the second cutting edge.

2. The razor cartridge of claim 1, wherein a difference between the first gap and the second gap has a value between 0.01 mm and 0.35 mm.

3. The razor cartridge of claim 1, wherein a ratio of the first gap to the second gap has a value between 1.05 and 1.50.

4. The razor cartridge of claim 1, wherein a width of the second rinsing channel is the same or becomes smaller as moving away from the first rinsing channel.

5. The razor cartridge of claim 1, wherein the first cutting edge has a zero or negative protrusion value.

6. The razor cartridge of claim 1, wherein the second cutting edge has a zero or positive protrusion value.

7. The razor cartridge of claim 1, wherein an angle between the first edge portion and the first base portion is smaller than an angle between the second edge portion and the second base portion.

8. The razor cartridge of claim 7, wherein a distance between the shaving plane and a boundary of the first edge portion and the first base portion is less than a distance between the shaving plane and a boundary of the second edge portion and the second base portion.

9. The razor cartridge of claim 8, wherein a vertical length of the first base portion is formed to be longer than a vertical length of the second base portion.

10. The razor cartridge of claim 1, further comprising a fourth blade arranged in a same direction as and located adjacent to the front of the first blade and comprising a fourth edge portion having a fourth base portion and a fourth cutting edge, wherein the first gap between the first cutting edge and the second cutting edge is greater than a fourth gap between the first cutting edge and the fourth cutting edge.

11. The razor cartridge of claim 10, wherein a ratio of the gap between the first cutting edge and the second cutting edge to the fourth gap between the first cutting edge and the fourth cutting edge is greater than a ratio of a lateral gap between the first base portion and the second base portion to a lateral gap between the first base portion and the fourth base portion.

12. The razor cartridge of claim 1, wherein the protrusion value of the first cutting edge is greater than the protrusion value of the second cutting edge.

13. The razor cartridge of claim 12, wherein the third cutting edge has a protrusion value greater than that of the first cutting edge.

14. The razor cartridge of claim 13, wherein the protrusion value of the third cutting edge is equal to or greater than the protrusion value of the second cutting edge.

15. The razor cartridge of claim 13, wherein the protrusion values of the first to third cutting edges increase sequentially from the first cutting edge toward the third cutting edge.

* * * * *